United States Patent
Yamashita

(10) Patent No.: US 9,625,686 B2
(45) Date of Patent: Apr. 18, 2017

(54) ZOOMING OPTICAL SYSTEM, OPTICAL APPARATUS AND METHOD FOR MANUFACTURING ZOOMING OPTICAL SYSTEM

(71) Applicant: Nikon Corporation, Chiyoda-ku, Tokyo (JP)

(72) Inventor: Masashi Yamashita, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/472,472

(22) Filed: Aug. 29, 2014

(65) Prior Publication Data
US 2015/0043086 A1 Feb. 12, 2015

Related U.S. Application Data

(63) Continuation of application No. PCT/JP2013/055173, filed on Feb. 27, 2013.

(30) Foreign Application Priority Data

| Feb. 29, 2012 | (JP) | 2012-043806 |
| Feb. 29, 2012 | (JP) | 2012-043813 |
| Feb. 29, 2012 | (JP) | 2012-043830 |

(51) Int. Cl.
*G02B 15/14* (2006.01)
*G02B 27/64* (2006.01)
(Continued)

(52) U.S. Cl.
CPC ......... *G02B 15/14* (2013.01); *G02B 13/009* (2013.01); *G02B 15/173* (2013.01); *G02B 27/646* (2013.01); *Y10T 29/4984* (2015.01)

(58) Field of Classification Search
CPC G02B 1513/009; G02B 27/646; G02B 15/14; G02B 15/15; G02B 15/177; G02B 15/173
(Continued)

(56) References Cited

U.S. PATENT DOCUMENTS 7,253,965 B2   8/2007   Shibayama et al.
7,986,467 B2   7/2011   Tamura
(Continued)

FOREIGN PATENT DOCUMENTS

JP   2006-284763 A   10/2006
JP   2007-017533 A   1/2007
(Continued)

OTHER PUBLICATIONS

English translation of International Preliminary Report on Patentability from International Patent Application No. PCT/JP2013/055173, Sep. 12, 2014.

*Primary Examiner* — Thomas K Pham
*Assistant Examiner* — Marin Pichler
(74) *Attorney, Agent, or Firm* — Sharpiro, Gabor and Rosenberger, PLLC

(57) ABSTRACT

A compact zooming optical system, an optical apparatus and a method for manufacturing the zooming optical system having a vibration reduction function, a high zooming ratio, a wide-angle view and superb optical performance are provided, the system including, in order from an object side: a first lens group G1 having positive refractive power; a second lens group G2 having negative refractive power; a third lens group G3 having positive refractive power; and a fourth lens group G4 having negative refractive power; upon zooming from a wide-angle end state to a telephoto end state, a distance between the first lens group G1 and the second lens group G2, a distance between the second lens group G2 and the third lens group G3 and a distance between the third lens group G3 and the fourth lens group G4 being respectively varied; the third lens group G3 having, in order from the object side, a first segment group G31 having positive refractive power and a second segment group G32; the second segment group G32 being moved to have a (Continued)

component in a direction perpendicular to the optical axis; and predetermined conditional expressions being satisfied.

32 Claims, 22 Drawing Sheets

(51) Int. Cl.
G02B 13/00 (2006.01)
G02B 15/173 (2006.01)

(58) Field of Classification Search
USPC .......... 359/676, 677, 557, 684, 685–687
See application file for complete search history.

(56) References Cited

U.S. PATENT DOCUMENTS

| | | |
|---|---|---|
| 2006/0056055 A1 | 3/2006 | Obama et al. |
| 2006/0072213 A1 | 4/2006 | Shibayama et al. |
| 2007/0070514 A1 | 3/2007 | Obama |
| 2007/0070515 A1 | 3/2007 | Obama |
| 2007/0070516 A1 | 3/2007 | Obama et al. |
| 2008/0297901 A1 | 12/2008 | Mitsuki |
| 2009/0190234 A1 | 7/2009 | Sato |
| 2010/0014169 A1 | 1/2010 | Tamura |
| 2011/0273774 A1 | 11/2011 | Saruwatari |
| 2011/0273776 A1 | 11/2011 | Obama et al. |
| 2012/0200923 A1 | 8/2012 | Mitsuki |
| 2012/0307366 A1 | 12/2012 | Bito et al. |
| 2014/0334013 A1 | 11/2014 | Obama et al. |

FOREIGN PATENT DOCUMENTS

| | | |
|---|---|---|
| JP | 2007-212537 A | 8/2007 |
| JP | 2008-015251 A | 1/2008 |
| JP | 2008-033208 A | 2/2008 |
| JP | 2009-009104 A | 1/2009 |
| JP | 2009-042261 A | 2/2009 |
| JP | 2009-128606 A | 6/2009 |
| JP | 2009-128607 A | 6/2009 |
| JP | 2009-150970 A | 7/2009 |
| JP | 2010-160242 A | 7/2010 |
| JP | 2011-186159 A | 9/2011 |
| JP | 2011-186165 A | 9/2011 |
| JP | 2012-113107 A | 6/2012 |
| WO | WO 2011/102089 A1 | 8/2011 |

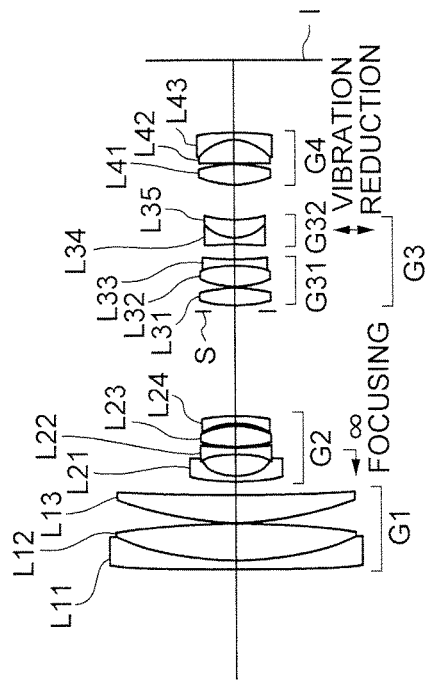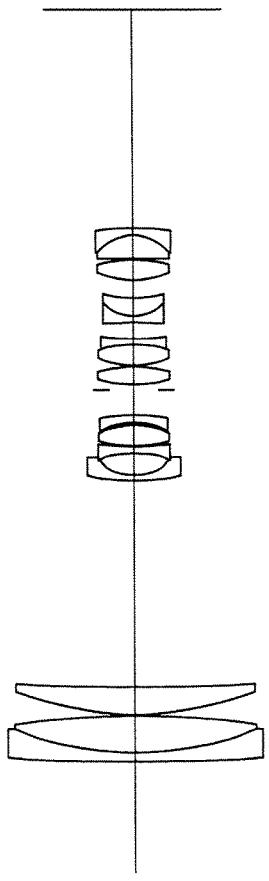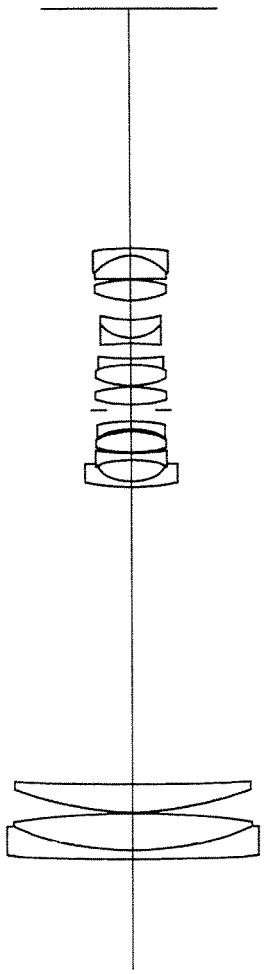
FIG. 1A
FIG. 1B
FIG. 1C

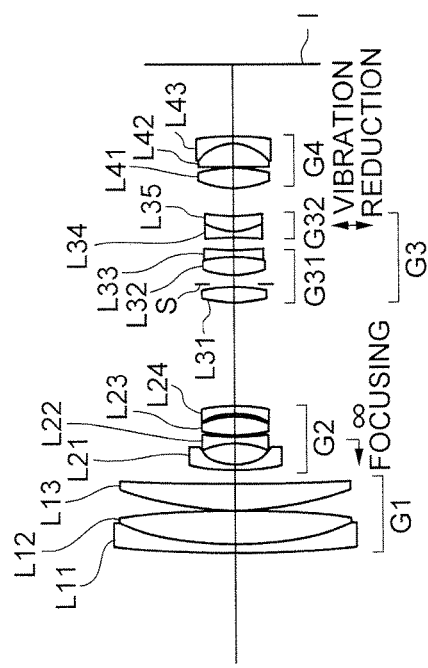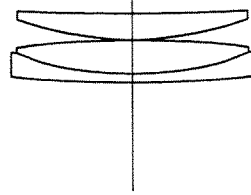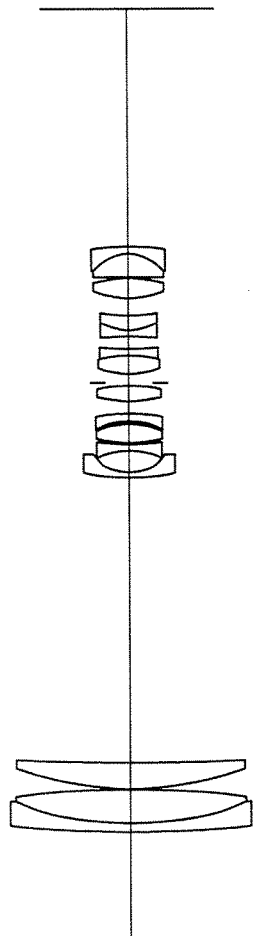
FIG. 4A
FIG. 4B
FIG. 4C

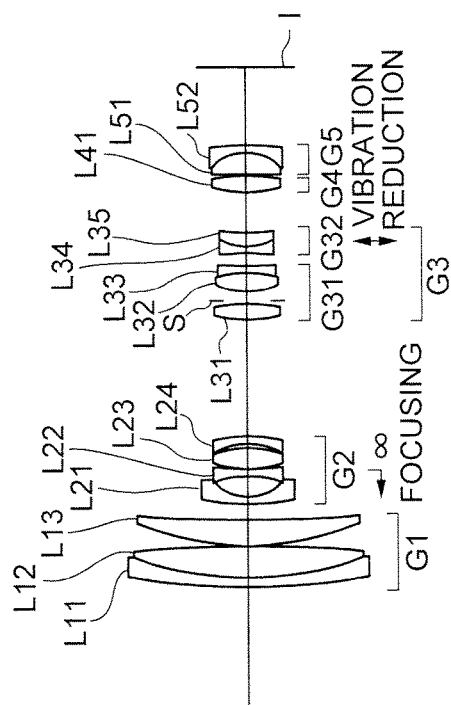
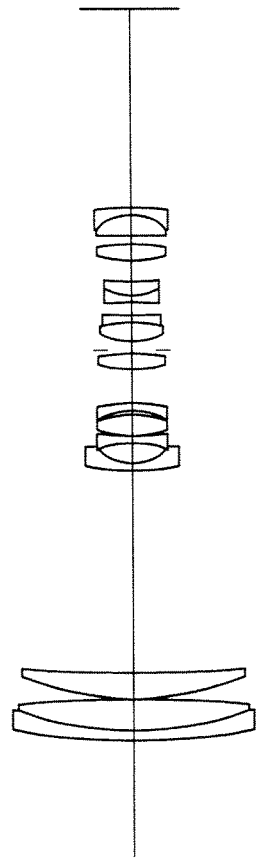
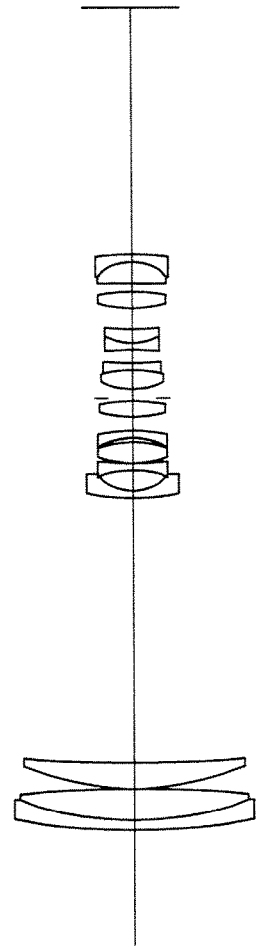
FIG. 16A
FIG. 16B
FIG. 16C

ZOOMING OPTICAL SYSTEM, OPTICAL APPARATUS AND METHOD FOR MANUFACTURING ZOOMING OPTICAL SYSTEM

TECHNICAL FIELD

The present invention relates to a zooming optical system, an optical apparatus and a method for manufacturing the zooming optical system.

BACKGROUND ART

There has hitherto been proposed a zooming optical system suitable for a phototaking camera, an electronic still camera, a video camera and the like. For example, refer to Japanese Patent Application Laid-Open Publication No. 2006-284763.

PRIOR ART DOCUMENT

Patent Document

Patent Document 1
Japanese Patent Application Laid-Open Publication No. 2006-284763

SUMMARY OF THE INVENTION

Problem to be Solved by the Invention

However, there has been a problem that a conventional zooming optical system is large in size and if high zooming ratio is intended while vibration reduction function being maintained, its optical performance is deteriorated remarkably.

Under such circumstances, the present invention is made in view of the above-described problem, and has an object to provide a compact zooming optical system having a vibration reduction function, a high zooming ratio, a wide-angle view and superb optical performance, an optical apparatus and a method for manufacturing the zooming optical system.

Means for Solving the Problem

According to a first aspect, there is provided a zooming optical system including, in order from an object side: a first lens group having positive refractive power; a second lens group having negative refractive power; a third lens group having positive refractive power; and a fourth lens group having negative refractive power;

upon zooming from a wide-angle end state to a telephoto end state, a distance between the first lens group and the second lens group, a distance between the second lens group and the third lens group and a distance between the third lens group and the fourth lens group being respectively varied;

the third lens group having, in order from the object side, a first segment group having positive refractive power and a second segment group;

the second segment group being moved to have a component in a direction perpendicular to the optical axis; and the following conditional expression being satisfied:

$$8.00 < f1/(-f2) < 10.00$$

where f1 denotes a focal length of the first lens group, and f2 denotes a focal length of the second lens group.

According to a second aspect of the present invention, there is provided an optical apparatus having the zooming optical system according to the first aspect of the present invention.

According to a third aspect of the present invention, there is provided a zooming optical system including, in order from an object side: a first lens group having positive refractive power; a second lens group having negative refractive power; a third lens group having positive refractive power; and a fourth lens group having positive refractive power;

upon zooming from a wide-angle end state to a telephoto end state, a distance between the first lens group and the second lens group, a distance between the second lens group and the third lens group and a distance between the third lens group and the fourth lens group being respectively varied;

the third lens group having, in order from the object side, a first segment group having positive refractive power and a second segment group;

the second segment group being moved to have a component in a direction perpendicular to the optical axis; and the following conditional expression being satisfied:

$$2.80 < f1/f3 < 4.50$$

where f1 denotes a focal length of the first lens group, and f3 denotes a focal length of the third lens group.

According to a fourth aspect of the present invention, there is provided an optical apparatus having the zooming optical system according to the third aspect of the present invention.

According to a fifth aspect of the present invention, there is provided a zooming optical system including, in order from an object side: a first lens group having positive refractive power; a second lens group having negative refractive power; a third lens group having positive refractive power; and a fourth lens group having positive refractive power;

upon zooming from a wide-angle end state to a telephoto end state, a distance between the first lens group and the second lens group, a distance between the second lens group and the third lens group and a distance between the third lens group and the fourth lens group being respectively varied;

the third lens group having, in order from the object side, a first segment group having positive refractive power and a second segment group;

the second segment group being moved to have a component in a direction perpendicular to the optical axis; and the following conditional expressions being satisfied:

$$0.20 < |f32|/f1 < 0.43$$

$$0.60 < f31/f3 < 0.90$$

where f1 denotes a focal length of the first lens group, f3 denotes a focal length of the third lens group, f31 denotes a focal length of the first segment group, and f32 denotes a focal length of the second segment group.

According to a sixth aspect of the present invention, there is provided an optical apparatus having the zooming optical system according to the fifth aspect of the present invention.

According to a seventh aspect, there is provided a method for manufacturing a zooming optical system comprising, in order from an object side: a first lens group having positive refractive power; a second lens group having negative refractive power; a third lens group having positive refractive power; and a fourth lens group having positive refractive power;

said method comprising steps of
constructing the third lens group to include, in order from the object side, a first segment group having positive refractive power and a second segment group,
constructing the first lens group and the second lens group such that the following conditional expression may be satisfied:

$8.00 < f1/(-f2) < 10.00$ where f1 denotes a focal length of the first lens group, and f2 represents a focal length of the second lens group, constructing such that a distance between the first lens group and the second lens group, a distance between the second lens group and the third lens group and a distance between the third lens group and the fourth lens group may be varied respectively upon zooming to the telephoto end state from the wide-angle end state, and
constructing the second segment group to move in a direction having a component perpendicular to the optical axis.

According to an eighth aspect, there is provided a method for manufacturing a zooming optical system comprising, in order from an object side: a first lens group having positive refractive power; a second lens group having negative refractive power; a third lens group having positive refractive power; and a fourth lens group having positive refractive power;
said method comprising steps of
constructing the third lens group to include, in order from the object side, a first segment group having positive refractive power and a second segment group,
constructing the first lens group and the third lens group such that the following conditional expression may be satisfied:

$2.80 < f1/f3 < 4.50$ where f1 denotes a focal length of the first lens group, and f3 represents a focal length of the third lens group, constructing such that a distance between the first lens group and the second lens group, a distance between the second lens group and the third lens group and a distance between the third lens group and the fourth lens group respectively varied, upon zooming to the telephoto end state from the wide-angle end state, and
constructing the second segment group to move in a direction having a component perpendicular to the optical axis.

According to a ninth aspect, there is provided a method for manufacturing a zooming optical system comprising, in order from an object side: a first lens group having positive refractive power; a second lens group having negative refractive power; a third lens group having positive refractive power; and a fourth lens group having positive refractive power;
said method comprising steps of
constructing the third lens group to include, in order from an object side, a first segment group having positive refractive power and a second segment group,
constructing the first lens group and the third lens group such that the following conditional expressions may be satisfied:

$0.20 < |f32|/f1 < 0.43$ $0.60 < f31/f3 < 0.90$ where f1 denotes a focal length of the first lens group, f3 represents a focal length of the third lens group, f31 denotes a focal length of the first segment group, and f32 represents a focal length of the second segment group,
constructing such that a distance between the first lens group and the second lens group, a distance between the second lens group and the third lens group and a distance between the third lens group and the fourth lens group respectively varied upon zooming to the telephoto end state from the wide-angle end state, and
constructing the second segment group to move in a direction having a component perpendicular to the optical axis.

Effect of the Invention

According to the present invention, there can be provided the compact zooming optical system that has the vibration reduction function, the high zooming ratio, the wide-angle view and the superb optical performance, the optical apparatus, and the method for manufacturing the zooming optical system.

BRIEF DESCRIPTION OF THE DRAWINGS

FIGS. 1A, 1B and 1C are, respectively, sectional views in a wide-angle end state, an intermediate focal length state and a telephoto end state, of a zooming optical system according to a first Example relating to the first to third embodiments of the present application.

FIGS. 4A, 4B and 4C are, respectively, the sectional views in the wide-angle end state, the intermediate focal length state and the telephoto end state, of the zooming optical system according to a second Example relating to the first to third embodiments of the present application.

FIGS. 16A, 16B and 16C are, respectively, the sectional views in the wide-angle end state, the intermediate focal length state and the telephoto end state, of the zooming optical system according to a sixth Example relating to the first to third embodiments of the present application.

EMBODIMENTS FOR CARRYING OUT THE INVENTION

Figure 2A:
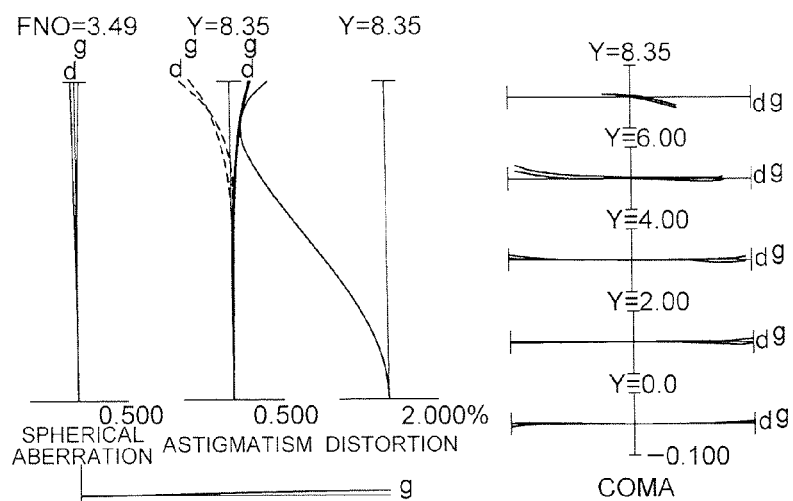
FIGS. 2A, 2B and 2C are, respectively, graphs showing various aberrations in the wide-angle end state, the intermediate focal length state and the telephoto end state, of the zooming optical system according to the first Example of the present application upon focusing on infinity.

A zooming optical system, an optical apparatus and a method for manufacturing the zooming optical system according to a first embodiment of the present application will hereinafter be described.

The zooming optical system according to the first embodiment of the present application includes, in order from an object side: a first lens group having positive refractive power; a second lens group having negative refractive power; a third lens group having positive refractive power; and a fourth lens group having negative refractive power; upon zooming from a wide-angle end state to a telephoto end state, a distance between the first lens group and the second lens group, a distance between the second lens group and the third lens group and a distance between the third lens group and the fourth lens group are respectively varied; the third lens group has, in order from the object side, a first segment group having positive refractive power and a second segment group; the second segment group is moved to have a component in a direction perpendicular to the optical axis; and the following conditional expression (1) is satisfied:

$$8.00 < f1/(-f2) < 10.00 \qquad (1)$$

where f1 denotes a focal length of the first lens group, and f2 denotes a focal length of the second lens group.

The zooming optical system according to the first embodiment of the present application, as described above, with the second segment group in the third lens group being moved to include a component in a direction perpendicular to the optical axis, is thereby enabled to correct an image blur caused by a camera shake, i.e., to reduce vibrations.

The conditional expression (1) described above defines a focal length of the first lens group with respect to the focal length of the second lens group. The zooming optical system according to the first embodiment of the present application satisfies the conditional expression (1) and is thereby enabled to preferably correct a curvature of field in the wide-angle end state, and to preferably correct a spherical aberration in the telephoto end state.

When a corresponding value of the conditional expression (1) of the zooming optical system according to the first embodiment of the present application exceeds an upper limit value, a zooming effect of the first lens group decreases. Therefore, the refractive power of the second lens group needs to increase for ensuring a zooming ratio, resulting undesirably in causing occurrence of the curvature of field in the wide-angle end state and occurrence of the spherical aberration in the telephoto end state. Note that the upper limit value of the conditional expression (1) is set to, more preferably, 9.70 for further ensuring the effects of the present application.

Whereas when the corresponding value of the conditional expression (1) of the zooming optical system according to the first embodiment of the present application decreases below a lower limit value, the refractive power of the first lens group increases, and it is undesirably difficult to correct the spherical aberration in the telephoto end state. It is to be noted that the lower limit value of the conditional expression (1) is set to, more preferably, 8.10 for further ensuring the effects of the present application.

With this configuration described above, it is feasible to realize the compact zooming optical system having a vibration reduction function, a high zooming ratio, a wide-angle view and superb optical performance.

It is desirable that the second segment group of the zooming optical system according to the first embodiment of the present application has negative refractive power. With this configuration, the zooming optical system according to the first embodiment of the present application is scaled down, and it is possible to restrain variation in the coma when being eccentric.

Further, it is desirable that the zooming optical system according to the first embodiment of the present application satisfies the following conditional expression (2).

$$0.60 < f3/f4 < 0.90 \quad (2)$$

where f3 denotes a focal length of the third lens group, and f4 denotes a focal length of the fourth lens group.

The conditional expression (2) defines the focal length of the third lens group with respect to the focal length of the fourth lens group. The zooming optical system according to the first embodiment of the present application satisfies the conditional expression (2) and is thereby enabled to preferably correct the curvature of field and the coma in the wide-angle end state, and to preferably correct the spherical aberration in the telephoto end state.

When the corresponding value of the conditional expression (2) of the zooming optical system according to the first embodiment of the present application exceeds the upper limit value, the refractive power of the fourth lens group rises, and it is undesirably difficult to correct the curvature of field and the coma in the wide-angle end state. Note that the upper limit value of the conditional expression (2) is set to, more preferably, 0.85 for further ensuring the effects of the present application.

Whereas when the corresponding value of the conditional expression (2) of the zooming optical system according to the first embodiment of the present application decreases below the lower limit value, the refractive power of the third lens group increases, and it is undesirably difficult to correct the spherical aberration particularly in the telephoto end state. It is to be noted that the lower limit value of the conditional expression (2) is set to, more preferably, 0.65 for further ensuring the effects of the present application.

Furthermore, it is desirable that the zooming optical system according to the first embodiment of the present application satisfies the following conditional expression (3).

$$2.80 < f1/f3 < 4.50 \quad (3)$$

where f1 denotes the focal length of the first lens group, and f3 denotes the focal length of the third lens group.

The conditional expression (3) defines the focal length of the first lens group with respect to the focal length of the third lens group. The zooming optical system according to the first embodiment of the present application satisfies the conditional expression (3) and is thereby enabled to preferably correct the curvature of field in the wide-angle end state, and to preferably correct the spherical aberration in the telephoto end state.

When the corresponding value of the conditional expression (3) of the zooming optical system according to the first embodiment of the present application exceeds the upper limit value, the zooming effect of the first lens group decreases. Hence, the refractive power of the second lens group needs to increase for ensuring the zooming ratio, resulting undesirably in causing the occurrence of the curvature of field in the wide-angle end state and the occurrence of the spherical aberration in the telephoto end state. Note that the upper limit value of the conditional expression (3) is set to, more preferably, 4.30 for further ensuring the effects of the present application.

Whereas when the corresponding value of the conditional expression (3) of the zooming optical system according to the first embodiment of the present application decreases below the lower limit value, the refractive power of the first lens group increases, and it is undesirably difficult to correct the spherical aberration in the telephoto end state. It is to be noted that the lower limit value of the conditional expression (3) is set to, more preferably, 3.00 for further ensuring the effects of the present application.

Moreover, it is desirable for the zooming optical system according to the first embodiment of the present application satisfies the following conditional expression (4).

$$2.20 < f1/f4 < 3.50 \quad (4)$$

where f1 denotes the focal length of the first lens group, and f4 denotes the focal length of the fourth lens group.

The conditional expression (4) defines the focal length of the first lens group with respect to the focal length of the fourth lens group. The zooming optical system according to the first embodiment of the present application satisfies the conditional expression (4) and is thereby enabled to preferably correct the curvature of field and the coma in the wide-angle end state, and to preferably correct the spherical aberration in the telephoto end state.

When the corresponding value of the conditional expression (4) of the zooming optical system according to the first embodiment of the present application exceeds the upper limit value, the refractive power of the fourth lens group rises, and it is undesirably difficult to correct the curvature of field and the coma in the wide-angle end state. Note that the upper limit value of the conditional expression (4) is set to, more preferably, 3.30 for further ensuring the effects of the present application.

Whereas when the corresponding value of the conditional expression (4) of the zooming optical system according to the first embodiment of the present application decreases below the lower limit value, the refractive power of the first lens group increases, and it is undesirably difficult to correct the spherical aberration particularly in the telephoto end state. It is to be noted that the lower limit value of the conditional expression (4) is set to, more preferably, 2.50 for further ensuring the effects of the present application.

Further, in the zooming optical system according to the first embodiment of the present application, it is desirable that at least a part of the second lens group moves along the optical-axis when focusing. The focusing is conducted by at least apart of the compact and light-weight second lens group, whereby quick focusing can be attained.

Moreover, it is desirable that the zooming optical system according to the first embodiment of the present application satisfies the following conditional expression (5).

$$0.20 < |f32|/f1 < 0.43 \quad (5)$$

where f1 denotes the focal length of the first lens group, and f32 denotes the focal length of the second segment group.

The conditional expression (5) defines the focal length of the second segment group with respect to the focal length of the first lens group. The zooming optical system according to the first embodiment of the present application satisfies the conditional expression (5) and is thereby enabled to preferably correct the spherical aberration in the telephoto end state, and to preferably correct the coma when moving the second segment group to include the component in a direction perpendicular to the optical axis.

When the corresponding value of the conditional expression (5) of the zooming optical system according to the first embodiment of the present application exceeds the upper limit value, the refractive power of the first lens group rises, and it is undesirably difficult to correct the spherical aberration in the telephoto end state. Note that the upper limit value of the conditional expression (5) is set to, more preferably, 0.41 for further ensuring the effects of the present application.

Whereas when the corresponding value of the conditional expression (5) of the zooming optical system according to the first embodiment of the present application decreases below the lower limit value, the refractive power of the second segment lens group increase. It is therefore undesirable to cause deterioration of the coma when moving the second segment lens group to include the component in a direction perpendicular to the optical axis. It is to be noted that the lower limit value of the conditional expression (5) is set to, more preferably, 0.25 for further ensuring the effects of the present application.

Further, it is desirable that the second segment group of the zooming optical system according to the first embodiment of the present application is configured to include a cemented lens having one positive lens and one negative lens. With this configuration, the decentering coma can be preferably corrected when moving the second segment group to include the component in a direction perpendicular to the optical axis.

Furthermore, it is desirable that the zooming optical system according to the first embodiment of the present application satisfies the following conditional expression (6).

$$0.35 < (-f2)/f3 < 0.55 \quad (6)$$

where f2 denotes the focal length of the second lens group, and f3 denotes the focal length of the third lens group.

The conditional expression (6) defines the focal length of the second lens group with respect to the focal length of the third lens group. The zooming optical system according to the first embodiment of the present application satisfies the conditional expression (6) and is thereby enabled to preferably correct the curvature of field in the wide-angle end state, and to preferably correct the spherical aberration in the telephoto end state.

When the corresponding value of the conditional expression (6) of the zooming optical system according to the first embodiment of the present application exceeds the upper limit value, the zooming effect of the first lens group decreases. Hence, the refractive power of the first lens group needs to increase for ensuring the zooming ratio, resulting undesirably in causing the occurrence of the curvature of field in the wide-angle end state and the occurrence of the spherical aberration in the telephoto end state. Note that the upper limit value of the conditional expression (6) is set to, more preferably, 0.52 for further ensuring the effects of the present application.

Whereas when the corresponding value of the conditional expression (6) of the zooming optical system according to the first embodiment of the present application decreases below the lower limit value, the zooming effect of the third lens group decreases. Therefore, the refractive power of the first lens group or the second lens group needs to increase for ensuring the zooming ratio, resulting undesirably in the difficulty to correct the spherical aberration in the telephoto end state and to correct the curvature of field in the wide-angle end state. Note that the lower limit value of the conditional expression (6) is set to, more preferably, 0.38 for further ensuring the effects of the present application.

Moreover, it is desirable that the first lens group of the zooming optical system according to the first embodiment of the present application moves along the optical-axis when zooming to the telephoto end state from the wide-angle end state. With this configuration, the refractive power of each of the respective lens groups relating to the zooming, i.e., of the first to fourth lens groups can be decreased, and it is feasible to ensure the preferable optical performance covering the wide-angle end state and the telephoto end state throughout.

The optical apparatus of the present application is characterized by having the zooming optical system configured as described above according to the first embodiment. This configuration enables actualization of the compact optical apparatus having the vibration reduction function, the high zooming ratio, the wide-angle view and the superb optical performance.

A method for manufacturing the zooming optical system according to the first embodiment of the present application is a method for manufacturing the zooming optical system comprising, in order from an object side: a first lens group having positive refractive power; a second lens group having negative refractive power; a third lens group having positive refractive power; and a fourth lens group having positive refractive power;

said method comprising steps of constructing the third lens group to include, in order from the object side, a first segment group having positive refractive power and a second segment group, constructing the first lens group and the second lens group such that the following conditional expression (1) may be satisfied:

$$8.00 < f1/(-f2) < 10.00 \quad (1)$$

where f1 denotes a focal length of the first lens group, and f2 represents a focal length of the second lens group, constructing such that a distance between the first lens group and the second lens group, a distance between the second lens group and the third lens group and a distance between the third lens group and the fourth lens group may be varied respectively upon zooming to the telephoto end state from the wide-angle end state, and constructing the second segment group to move in a direction having a component perpendicular to the optical axis.

A zooming optical system, an optical apparatus and a method for manufacturing the zooming optical system according to a second embodiment of the present application will hereinafter be described.

The zooming optical system according to the second embodiment of the present application includes, in order from an object side: a first lens group having positive refractive power; a second lens group having negative refractive power; a third lens group having positive refractive power; and a fourth lens group having negative refractive power; upon zooming from a wide-angle end state to a telephoto end state, a distance between the first lens group and the second lens group, a distance between the second lens group and the third lens group and a distance between the third lens group and the fourth lens group are respectively varied; the third lens group has, in order from the object side, a first segment group having positive refractive power and a second segment group; the second segment group is moved to have a component in a direction perpendicular to the optical axis; and the following conditional expression (3) is satisfied:

$$2.80 < f1/f3 < 4.50 \quad (3)$$

where f1 denotes a focal length of the first lens group, and f3 denotes a focal length of the third lens group.

The zooming optical system according to the second embodiment of the present application, as described above, with the second segment group in the third lens group being moved to include the component in a direction perpendicular to the optical axis, is thereby enabled to correct the image blur caused by the camera shake, i.e., to reduce the vibrations.

The conditional expression (3) described above defines a focal length of the first lens group with respect to the focal length of the third lens group. The zooming optical system according to the second embodiment of the present application satisfies the conditional expression (3) and is thereby enabled to preferably correct the curvature of field in the wide-angle end state, and to preferably correct the spherical aberration in the telephoto end state.

When the corresponding value of the conditional expression (3) of the zooming optical system according to the second embodiment of the present application exceeds the upper limit value, the zooming effect of the first lens group decreases. Therefore, the refractive power of the second lens group needs to increase for ensuring the zooming ratio, resulting undesirably in causing the occurrence of the curvature of field in the wide-angle end state and the occurrence of the spherical aberration in the telephoto end state. Note that the upper limit value of the conditional expression (3) is set to, more preferably, 4.30 for further ensuring the effects of the present application.

Whereas when the corresponding value of the conditional expression (3) of the zooming optical system according to the first embodiment of the present application decreases below the lower limit value, the refractive power of the first lens group increases, and it is undesirably difficult to correct the spherical aberration in the telephoto end state. It is to be noted that the lower limit value of the conditional expression (3) is set to, more preferably, 3.00 for further ensuring the effects of the present application.

With this configuration described above, it is feasible to realize the compact zooming optical system having the vibration reduction function, the high zooming ratio, the wide-angle view and the superb optical performance.

It is desirable that the second segment group of the zooming optical system according to the second embodiment of the present application has negative refractive power. With this configuration, the zooming optical system according to the second embodiment of the present application is scaled down, and it is possible to restrain the variation in the coma when being eccentric.

Further, it is desirable that the zooming optical system according to the second embodiment of the present application satisfies the following conditional expression (4).

$$2.20 < f1/f4 < 3.50 \quad (4)$$

where f1 denotes the focal length of the first lens group, and f4 denotes the focal length of the fourth lens group.

The conditional expression (4) defines the focal length of the third lens group with respect to the focal length of the fourth lens group. The zooming optical system according to the second embodiment of the present application satisfies the conditional expression (4) and is thereby enabled to preferably correct the curvature of field and the coma in the wide-angle end state, and to preferably correct the spherical aberration in the telephoto end state.

When the corresponding value of the conditional expression (4) of the zooming optical system according to the second embodiment of the present application exceeds the upper limit value, the refractive power of the fourth lens group rises, and it is undesirably difficult to correct the curvature of field and the coma in the wide-angle end state. Note that the upper limit value of the conditional expression (4) is set to, more preferably, 3.30 for further ensuring the effects of the present application.

Whereas when the corresponding value of the conditional expression (4) of the zooming optical system according to the second embodiment of the present application decreases below the lower limit value, the refractive power of the first lens group increases, and it is undesirably difficult to correct the spherical aberration particularly in the telephoto end state. It is to be noted that the lower limit value of the conditional expression (4) is set to, more preferably, 2.50 for further ensuring the effects of the present application.

Further, in the zooming optical system according to the second embodiment of the present application, it is desirable that at least a part of the second lens group moves along the optical-axis when focusing. The focusing is conducted by at least apart of the compact and light-weight second lens group, whereby the quick focusing can be attained.

Moreover, it is desirable that the zooming optical system according to the second embodiment of the present application satisfies the following conditional expression (6).

$$0.35 < (-f2)/f3 < 0.55 \quad (6)$$

where f2 denotes the focal length of the second lens group, and f3 denotes the focal length of the third lens group.

The conditional expression (6) defines the focal length of the second lens group with respect to the focal length of the third lens group. The zooming optical system according to the second embodiment of the present application satisfies the conditional expression (6) and is thereby enabled to preferably correct the curvature of field in the wide-angle end state, and to preferably correct the spherical aberration in the telephoto end state.

When the corresponding value of the conditional expression (6) of the zooming optical system according to the second embodiment of the present application exceeds the upper limit value, the zooming effect of the second lens group decreases. Therefore, the refractive power of the first lens group needs to increase for ensuring the zooming ratio, resulting undesirably in causing the occurrence of the curvature of field in the wide-angle end state and the occurrence of the spherical aberration in the telephoto end state. Note that the upper limit value of the conditional expression (6) is set to, more preferably, 0.52 for further ensuring the effects of the present application.

Whereas when the corresponding value of the conditional expression (6) of the zooming optical system according to the second embodiment of the present application decreases below the lower limit value, the zooming effect of the third lens group increases. Hence, the refractive power of the first lens group or the second lens group needs to increase for ensuring the zooming ratio, resulting undesirably in the difficulty to correct the spherical aberration in the telephoto end state and to correct the curvature of field in the wide-angle end state. Note that the lower limit value of the conditional expression (6) is set to, more preferably, 0.38 for further ensuring the effects of the present application.

Further, it is desirable that the second segment group of the zooming optical system according to the second embodiment of the present application is configured to include the cemented lens having one positive lens and one negative lens. With this configuration, the decentering coma can be preferably corrected when moving the second segment group to include the component in a direction perpendicular to the optical axis.

Furthermore, it is desirable that the zooming optical system according to the second embodiment of the present application satisfies the following conditional expression (5).

$$0.20<|f32|/f1<0.43 \tag{5}$$

where f1 denotes the focal length of the first lens group, and f32 denotes the focal length of the second segment group.

The conditional expression (5) defines the focal length of the second segment group with respect to the focal length of the first lens group. The zooming optical system according to the second embodiment of the present application satisfies the conditional expression (5) and is thereby enabled to preferably correct the spherical aberration in the telephoto end state, and to preferably correct the coma when moving the second segment group to include the component in a direction perpendicular to the optical axis.

When the corresponding value of the conditional expression (5) of the zooming optical system according to the second embodiment of the present application exceeds the upper limit value, the refractive power of the first lens group rises, and it is undesirably difficult to correct the spherical aberration in the telephoto end state. Note that the upper limit value of the conditional expression (5) is set to, more preferably, 0.41 for further ensuring the effects of the present application.

Whereas when the corresponding value of the conditional expression (5) of the zooming optical system according to the second embodiment of the present application decreases below the lower limit value, the refractive power of the second segment group increases. It is therefore undesirable to cause deterioration in the coma when moving the second lens group to include the component in a direction perpendicular to the optical axis. It is to be noted that the lower limit value of the conditional expression (5) is set to, more preferably, 0.25 for further ensuring the effects of the present application.

Moreover, it is desirable that the first lens group of the zooming optical system according to the second embodiment of the present application moves along the optical axis when zooming to the telephoto end state from the wide-angle end state. With this configuration, the refractive power of each of the respective lens groups relating to the zooming, i.e., of the first to fourth lens groups can be decreased, and it is feasible to ensure the preferable optical performance covering the wide-angle end state and the telephoto end state throughout.

The optical apparatus of the present application is characterized by having the zooming optical system configured as described above according to the second embodiment. This configuration enables the actualization of the compact optical apparatus having the vibration reduction function, the high zooming ratio, the wide-angle view and the superb optical performance.

A method for manufacturing the zooming optical system according to the second embodiment of the present application is a method for manufacturing the zooming optical system comprising, in order from an object side: a first lens group having positive refractive power; a second lens group having negative refractive power; a third lens group having positive refractive power; and a fourth lens group having positive refractive power;

said method comprising steps of constructing the third lens group to include, in order from the object side, a first segment group having positive refractive power and a second segment group, constructing the first lens group and the third lens group such that the following conditional expression (3) may be satisfied:

$$2.80<f1/f3<4.50 \tag{3}$$

where f1 denotes a focal length of the first lens group, and f3 represents a focal length of the third lens group, constructing such that a distance between the first lens group and the second lens group, a distance between the second lens group and the third lens group and a distance between the third lens group and the fourth lens group respectively varied, upon zooming to the telephoto end state from the wide-angle end state, and constructing the second segment group to move in a direction having a component perpendicular to the optical axis.

A zooming optical system, an optical apparatus and a method for manufacturing the zooming optical system according to a third embodiment of the present application will hereinafter be described.

The zooming optical system according to the third embodiment of the present application includes, in order from an object side: a first lens group having positive refractive power; a second lens group having negative refractive power; a third lens group having positive refractive power; and a fourth lens group having negative refractive power; upon zooming from a wide-angle end state to a telephoto end state, a distance between the first lens group and the second lens group, a distance between the second lens group and the third lens group and a distance between the third lens group and the fourth lens group are respectively varied; the third lens group has, in order from the object side, a first segment group having positive refractive power and a second segment group; the second segment group is moved to have a component in a direction perpendicular to the optical axis; and the following conditional expressions (5) and (7) are satisfied:

$$0.20<|f32|/f1<0.43 \tag{5}$$

$$0.60<f31/f3<0.90 \tag{7}$$

where f1 denotes a focal length of the first lens group, f3 denotes a focal length of the third lens group, f31 denotes a focal length of the first segment group, and f32 denotes a focal length of the second segment group.

The zooming optical system according to the third embodiment of the present application, as described above, with the second segment group in the third lens group being moved to include the component in a direction perpendicular to the optical axis, is thereby enabled to correct the image blur caused by the camera shake, i.e., to reduce the vibrations.

The conditional expression (5) described above defines a focal length of the second segment group with respect to the focal length of the first lens group. The zooming optical system according to the third embodiment of the present application satisfies the conditional expression (5) and is thereby enabled to preferably correct the spherical aberration in the telephoto end state, and to preferably correct the coma when moving the second segment group to include the component in a direction perpendicular to the optical axis.

When the corresponding value of the conditional expression (5) of the zooming optical system according to the third embodiment of the present application exceeds the upper limit value, the refractive power of the first lens group rises, and it is undesirably difficult to correct the spherical aberration in the telephoto end state. Note that the upper limit value of the conditional expression (5) is set to, more preferably, 0.41 for further ensuring the effects of the present application.

Whereas when the corresponding value of the conditional expression (5) of the zooming optical system according to the third embodiment of the present application decreases below the lower limit value, the refractive power of the second segment group increases. It is therefore undesirable to cause the deterioration in the coma when moving the second lens group to include the component in a direction perpendicular to the optical axis. It is to be noted that the lower limit value of the conditional expression (5) is set to, more preferably, 0.25 for further ensuring the effects of the present application.

The conditional expression (7) defines the focal length of the first segment group with respect to the focal length of the third lens group. The zooming optical system according to the third embodiment of the present application satisfies the conditional expression (7) and is thereby enabled to preferably correct the spherical aberration in the telephoto end state, and to preferably correct the curvature of field in the wide-angle end state.

When the corresponding value of the conditional expression (7) of the zooming optical system according to the third embodiment of the present application exceeds the upper limit value, the refractive power of the third lens group rises, and it is undesirably difficult to correct the spherical aberration in the telephoto end state. Note that the upper limit value of the conditional expression (7) is set to, more preferably, 0.85 for further ensuring the effects of the present application.

Whereas when the corresponding value of the conditional expression (7) of the zooming optical system according to the third embodiment of the present application decreases below the lower limit value, the zooming effect of the third lens group decreases. Therefore, the refractive power of the first lens group or the second lens group needs to increase for ensuring the zooming ratio, resulting undesirably in the difficulty to correct the spherical aberration in the telephoto end state and to correct the curvature of field in the wide-angle end state. Note that the lower limit value of the conditional expression (7) is set to, more preferably, 0.65 for further ensuring the effects of the present application.

This configuration enables the actualization of the compact optical apparatus having the vibration reduction function, the high zooming ratio, the wide-angle view and the superb optical performance.

Further, it is desirable that the second segment group of the zooming optical system according to the third embodiment of the present application has negative refractive power. With this configuration, the zooming optical system according to the third embodiment of the present application is scaled down, and it is possible to restrain a variation in the coma when being eccentric.

Furthermore, it is desirable that the zooming optical system according to the third embodiment of the present application satisfies the following conditional expression (1).

$$8.00<f1/(-f2)<10.00 \qquad (1)$$

where f1 denotes a focal length of the first lens group, and f2 denotes a focal length of the second lens group.

The conditional expression (1) defines the focal length of the first lens group with respect to the focal length of the second lens group. The zooming optical system according to the third embodiment of the present application satisfies the conditional expression (1) and is thereby enabled to preferably correct the curvature of field in the wide-angle end state, and to preferably correct the spherical aberration in the telephoto end state.

When the corresponding value of the conditional expression (1) of the zooming optical system according to the third embodiment of the present application exceeds the upper limit value, the zooming effect of the first lens group decreases. Therefore, the refractive power of the second lens group needs to increase for ensuring the zooming ratio, resulting undesirably in causing the occurrence of the curvature of field in the wide-angle end state and the occurrence of the spherical aberration in the telephoto end state. Note that the upper limit value of the conditional expression (1) is set to, more preferably, 9.70 for further ensuring the effects of the present application.

Whereas when the corresponding value of the conditional expression (1) of the zooming optical system according to the third embodiment of the present application decreases below the lower limit value, the refractive power of the first lens group increases, and it is undesirably difficult to correct the spherical aberration in the telephoto end state. It is to be noted that the lower limit value of the conditional expression (1) is set to, more preferably, 8.10 for further ensuring the effects of the present application.

Further, it is desirable that at least a part of the second lens group of the zooming optical system according to the third embodiment of the present application moves along the optical-axis when focusing. The focusing is conducted by at least a part of the compact and light-weight second lens group, whereby the quick focusing can be attained.

Moreover, it is desirable that the zooming optical system according to the third embodiment of the present application satisfies the following conditional expression (4).

$$2.20<f1/f4<3.50 \qquad (4)$$

where f1 denotes the focal length of the first lens group, and f4 denotes the focal length of the fourth lens group.

The conditional expression (4) defines the focal length of the first lens group with respect to the focal length of the fourth lens group. The zooming optical system according to the third embodiment of the present application satisfies the conditional expression (4) and is thereby enabled to well correct the curvature of field and the coma in the wide-angle end state, and to well correct the spherical aberration in the telephoto end state.

When the corresponding value of the conditional expression (4) of the zooming optical system according to the third embodiment of the present application exceeds the upper limit value, the refractive power of the fourth lens group rises, and it is undesirably difficult to correct the curvature of field and the coma in the wide-angle end state. Note that the upper limit value of the conditional expression (4) is set to, more preferably, 3.30 for further ensuring the effects of the present application.

Whereas when the corresponding value of the conditional expression (4) of the zooming optical system according to the third embodiment of the present application decreases below the lower limit value, the refractive power of the first lens group increases, resulting undesirably in the difficulty to correct the spherical aberration in the telephoto end state. Note that the lower limit value of the conditional expression (4) is set to, more preferably, 2.50 for further ensuring the effects of the present application.

Further, it is desirable that the second segment group of the zooming optical system according to the third embodiment of the present application is configured to include the cemented lens having one positive lens and one negative lens. With this configuration, the decentering coma can be preferably corrected when moving the second segment group to include the component in a direction perpendicular to the optical axis.

Furthermore, it is desirable that the zooming optical system according to the third embodiment of the present application satisfies the following conditional expression (2).

$$0.60 < f3/f4 < 0.90 \quad (2)$$

where f3 denotes the focal length of the third lens group, and f4 denotes the focal length of the fourth lens group.

The conditional expression (2) defines the focal length of the third lens group with respect to the focal length of the fourth lens group. The zooming optical system according to the third embodiment of the present application satisfies the conditional expression (2) and is thereby enabled to well correct the curvature of field and the coma in the wide-angle end state, and to well correct the spherical aberration in the telephoto end state.

When the corresponding value of the conditional expression (2) of the zooming optical system according to the third embodiment of the present application exceeds the upper limit value, the refractive power of the fourth lens group rises, and it is undesirably difficult to correct the curvature of field and the coma in the wide-angle end state. Note that the upper limit value of the conditional expression (2) is set to, more preferably, 0.85 for further ensuring the effects of the present application.

Whereas when the corresponding value of the conditional expression (2) of the zooming optical system according to the third embodiment of the present application decreases below the lower limit value, the refractive power of the third lens group increases, resulting undesirably in the difficulty to correct the spherical aberration particularly in the telephoto end state. It is to be noted that the lower limit value of the conditional expression (2) is set to, more preferably, 0.65 for further ensuring the effects of the present application.

Moreover, it is desirable that the first lens group of the zooming optical system according to the third embodiment of the present application moves along the optical axis when zooming to the telephoto end state from the wide-angle end state. With this configuration, the refractive power of each of the respective lens groups relating to the zooming, i.e., of the first to fourth lens groups can be decreased, and it is feasible to ensure the preferable optical performance covering the wide-angle end state and the telephoto end state throughout.

The optical apparatus of the present application is characterized by having the zooming optical system configured as described above according to the third embodiment. This configuration enables the actualization of the compact optical apparatus having the vibration reduction function, the high zooming ratio, the wide-angle view and the superb optical performance.

A method for manufacturing the zooming optical system according to the third embodiment of the present application is a method for manufacturing the zooming optical system in order from an object side: a first lens group having positive refractive power; a second lens group having negative refractive power; a third lens group having positive refractive power; and a fourth lens group having positive refractive power;

said method comprising steps of constructing the third lens group to include, in order from an object side, a first segment group having positive refractive power and a second segment group, constructing the first lens group and the third lens group such that the following conditional expressions (5) and (7) may be satisfied:

$$0.20 < |f32|/f1 < 0.43 \quad (5)$$

$$0.60 < f31/f3 < 0.90 \quad (7)$$

where f1 denotes a focal length of the first lens group, f3 represents a focal length of the third lens group, f31 denotes a focal length of the first segment group, and f32 represents a focal length of the second segment group, constructing such that a distance between the first lens group and the second lens group, a distance between the second lens group and the third lens group and a distance between the third lens group and the fourth lens group respectively varied upon zooming to the telephoto end state from the wide-angle end state, and constructing the second segment group to move in a direction having a component perpendicular to the optical axis.

The zooming optical systems relating to Examples of numeric values according to the first to third embodiment of the present application will hereinafter be described based on the accompanying drawings. It should be noted that first to sixth Examples are the Examples common to the first to third embodiments throughout.

First Example

FIGS. 1A, 1B and 1C are sectional views of the zooming optical system in the wide-angle end state, the intermediate focal length state and the telephoto end state according to the first Example of the first to third embodiments of the present application.

The zooming optical system according to the first Example is configured to include, in order from an object side, a first lens group G1 having positive refractive power, a second lens group G2 having negative refractive power, a third lens group G3 having positive refractive power and a fourth lens group G4 having positive refractive power.

The first lens group G1 is configured to include, in order from the object side, a cemented lens composed of a negative meniscus lens L11 with a convex surface directed to the object side and a biconvex positive lens L12, and a positive meniscus lens L13 with the convex surface directed to the object side.

The second lens group G2 is configured to include, in order from the object side, a negative meniscus lens L21 with the convex surface directed to the object side, a biconcave negative lens L22, a biconvex positive lens L23 and a negative meniscus lens L24 with a concave surface directed to the object side. Note that the negative meniscus lens L21 positioned closest to the object side in the second lens group G2 is an aspherical lens with an object-sided lens surface being aspherical.

The third lens group G3 is configured to include, in order from the object side, a first segment group G31 having positive refractive power and a second segment group G32 having negative refractive power. Note that an aperture stop S is provided on the object side of the third lens group G3.

The first segment group G31 is configured to include, in order from the object side, a biconvex positive lens L31, and a cemented lens composed of a biconvex positive lens L32 and a biconcave negative lens L33.

The second segment group G32 is configured to include, in order from the object side, only a cemented lens composed of a biconcave negative lens L34 and a positive meniscus lens L35 with the convex surface directed to the object side.

The fourth lens group G4 is configured to include, in order from the object side, a biconvex positive lens L41, and a cemented lens composed of a positive meniscus lens L42 with a concave surface directed to the object side and a negative meniscus lens L43 with the concave surface directed to the object side. Note that the positive lens L41 positioned closest to the object side in the fourth lens group G4 is an aspherical lens with the object-sided lens surface being aspherical.

Under the construction descried above, in the zooming optical system according to the first Example, when zooming to the telephoto end state from the wide-angle end state, the first lens group G1, the third lens group G3 and the fourth lens group G4 move toward the object side along the optical axis and the second lens group G2 moves along the optical axis so that an air distance between the first lens group G1 and the second lens group G2 increases, while an air distance between the second lens group G2 and the third lens group G3 decreases, and an air distance between the third lens group G3 and the fourth lens group G4 varies. Note that the aperture stop S moves together with the third lens group G3 on this occasion.

Further, the zooming optical system according to the first Example performs focusing on a near-distance object from an infinite-distance object by moving the second lens group G2 toward the object side along the optical axis.

Moreover, the zooming optical system according to the first Example reduces the vibrations by moving only the second segment group G32 as an anti-vibration lens group so as to include a component in a direction perpendicular to the optical axis when the camera shake (hand vibration) etc is caused.

The following Table 1 shows values of various items of data in the first Example. In Table 1, the symbol f represents a focal length, and BF denotes a back focus. In [Surface Data], m represents an optical surface number counted from the object side, r stands for a radius of curvature of the lens surface, d denotes a surface to surface distance on the optical axis, nd represents a refractive index with respect to the d-line ($\lambda$=587.6 nm), and vd is an Abbe number with respect to the d-line ($\lambda$=587.6 nm), respectively. Further, the symbol OP denotes an object plane, and I represents an image plane, respectively. Note that an expression "the radius-of-curvature r=$\infty$" implies a plane. Moreover, an aspherical surface is indicated by a surface number attached with a mark "*", and a paraxial radius of curvature is indicated in a column of the radius of curvature r of the aspherical surface.

In [Aspherical Data], with respect to the aspherical surface shown in the [Surface Data], an aspherical surface coefficient and a conic constant are given in the case of expressing a shape of the aspherical surface.

$$x=(h^2/r)/[1+[1-\kappa(h/r)^2]^{1/2}]+A4h^4+A6h^6+A8h^8+A10h^{10}$$

where h indicates a height in a direction perpendicular to the optical axis, x denotes a sag amount defined as a distance along the optical axis from a tangential plane of a vertex of the aspherical surface at the height h up to the aspherical surface, K denotes a conic constant, A4, A6, A8, A10 represent aspherical surface coefficients, and r represents a paraxial radius of curvature defined as a radius of curvature of a reference spherical surface. It is to be noted that "E-n" (n: integer) represents "$\times 10^{-n}$", and, for example, "1.234E-05" indicates "$1.234 \times 10^{-5}$".

In [Various Data], FNO is an F-number, 2$\omega$ is an angle of view (the unit is "°"), Y represents an image height, TL denotes an overall length of the zooming optical system, di (i is integer) denotes a variable surface to surface from an i-th surface, respectively. Note that W represents a wide-angle end state, M denotes an intermediate focal length state, and T denotes a telephoto end state, respectively.

In [Lens Group Data], the symbol ST indicates a starting surface of each lens group, i.e., a lens surface closest to the object side.

[Values for Conditional Expressions] shows corresponding values in the respective conditional expressions.

Herein, the focal length f, the radius of curvature r and other lengths described in Table 1 involve using generally "mm" as the unit of the length. However, the optical system acquires the equal optical performance even when proportionally enlarged or reduced and is not therefore limited to this unit.

It is to be noted that the reference symbols in Table described above shall be applied to Tables of the respective Examples.

Herein, in the lens in which f is a focal length of the whole lens system, and $\kappa$ is a vibration reduction coefficient, i.e., a ratio of a moving quantity of an image plane I to a moving quantity of the anti-vibration lens group when reducing the vibrations, it may be sufficient for correcting a rotating deviation of an angle $\theta$ that the anti-vibration lens group is moved by (f·than $\theta$)/$\kappa$ in the direction perpendicular to the optical axis. Accordingly, in the zooming optical system according to the first Example, in the wide-angle end state, the vibration reduction coefficient is −0.88, and the focal length is 10.0 (mm), and hence it follows that the moving quantity of the anti-vibration lens group for correcting the rotating deviation of 1.00° becomes 0.20 (mm). Further, in the telephoto end state, the vibration reduction coefficient is −1.92, and the focal length is 100.0 (mm), and therefore it follows that the moving quantity of the anti-vibration lens group for correcting the rotating deviation of 0.32° becomes 0.29 (mm).

TABLE 1

First Example

[Surface Data]

| m | r | d | nd | vd |
|---|---|---|---|---|
| op | $\infty$ | | | |
| 1 | 459.647 | 1.600 | 1.953660 | 30.27 |
| 2 | 57.423 | 6.819 | 1.497820 | 82.51 |
| 3 | −154.085 | 0.100 | 1.000000 | |
| 4 | 56.956 | 5.161 | 1.878896 | 41.01 |
| 5 | 569.648 | d5 | 1.000000 | |
| *6 | 38.479 | 1.200 | 1.882991 | 40.76 |
| 7 | 8.366 | 3.937 | 1.000000 | |
| 8 | −16.649 | 1.200 | 1.864046 | 41.96 |
| 9 | 53.630 | 0.100 | 1.000000 | |
| 10 | 21.938 | 3.669 | 1.846659 | 23.78 |
| 11 | −14.738 | 0.417 | 1.000000 | |
| 12 | −12.219 | 1.200 | 1.882997 | 40.76 |
| 13 | −43.622 | d13 | 1.000000 | |
| 14 | $\infty$ | 1.000 | 1.000000 | Aperture Stop S |
| 15 | 23.408 | 3.198 | 1.754999 | 52.31 |
| 16 | −31.880 | 0.100 | 1.000000 | |
| 17 | 15.118 | 3.851 | 1.497820 | 82.51 |

TABLE 1-continued

First Example

| | | | | |
|---|---|---|---|---|
| 18 | −19.673 | 1.200 | 1.856445 | 26.89 |
| 19 | 59.726 | 2.566 | 1.000000 | |
| 20 | −68.834 | 1.200 | 1.822803 | 45.06 |
| 21 | 7.553 | 3.351 | 1.878191 | 37.36 |
| 22 | 24.293 | d22 | 1.000000 | |
| *23 | 16.648 | 3.632 | 1.497820 | 82.51 |
| 24 | −23.750 | 0.100 | 1.000000 | |
| 25 | −553.763 | 4.361 | 1.577760 | 40.84 |
| 26 | −8.231 | 1.200 | 1.882997 | 40.76 |
| 27 | −42.498 | BF | 1.000000 | |
| I | ∞ | | | |

[Aspherical Data]

| m | κ | A4 | A6 | A8 | A10 |
|---|---|---|---|---|---|
| 6 | 1 | 1.54E−05 | −2.59E−08 | 3.23E−10 | 6.63E−12 |
| 23 | −0.3689 | −1.24E−05 | 6.50E−07 | −5.31E−09 | 1.67E−10 |

[Various Data]
Zooming ratio 10.00

| | W | M | T |
|---|---|---|---|
| f | 10.00 | 50.02 | 100.00 |
| FNO | 3.50 | 4.80 | 5.60 |
| 2ω | 82.49° | 18.42° | 9.30° |
| Y | 8.350 | 8.350 | 8.350 |
| TL | 92.33 | 135.76 | 153.35 |
| BF | 13.25 | 39.10 | 42.51 |
| d5 | 2.301 | 37.043 | 53.748 |
| d13 | 19.357 | 5.095 | 2.400 |
| d22 | 6.260 | 3.363 | 3.524 |

[Lens Group Data]

| | ST | f |
|---|---|---|
| G1 | 1 | 85.1 |
| G2 | 6 | −9.4 |
| G3 | 15 | 21.3 |
| G4 | 23 | 28.4 |

[Values for Conditional Expressions]

| | |
|---|---|
| (1) | f1/(−f2) = 9.04 |
| (2) | f3/f4 = 0.75 |
| (3) | f1/f3 = 3.99 |
| (4) | f1/f4 = 3.00 |
| (5) | |f32|/f1 = 0.28 |
| (6) | (−f2)/f3 = 0.44 |
| (7) | f31/f3 = 0.75 |

Figure 2B:
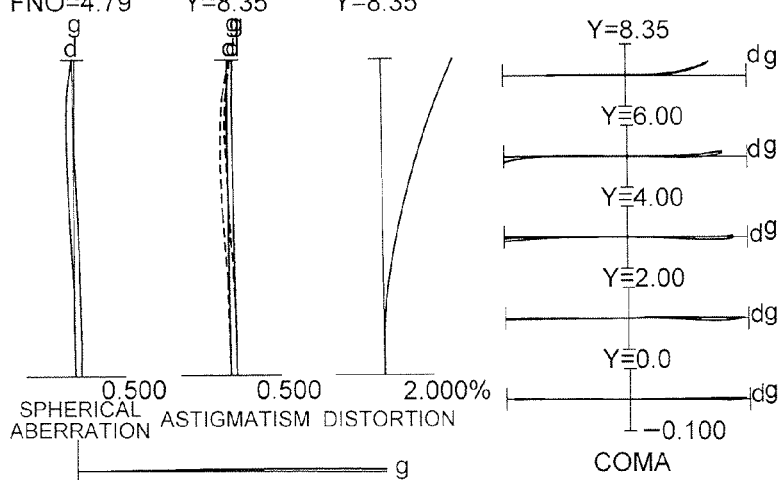
Figure 2C:
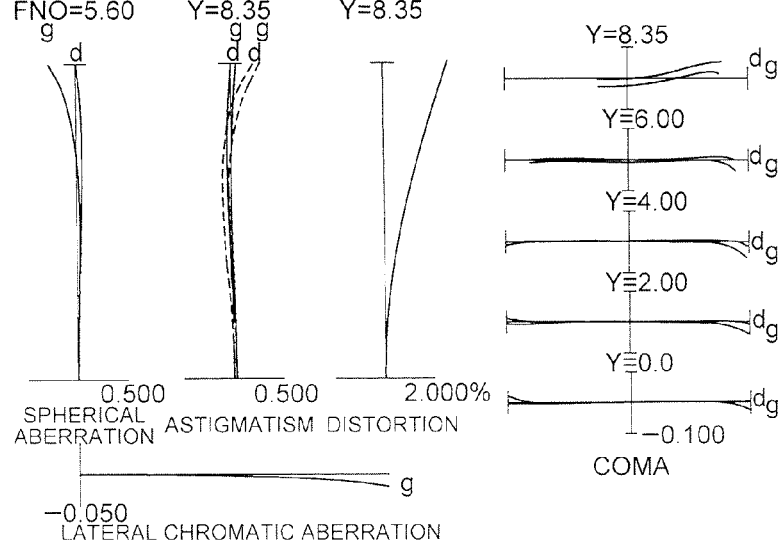

FIGS. 2A, 2B and 2C are diagrams of various aberrations when focusing on the infinite-distance object in the wide-angle end state, the intermediate focal length state and the telephoto end state of the zooming optical system according to the first Example of the present application, respectively.

Figure 3A:
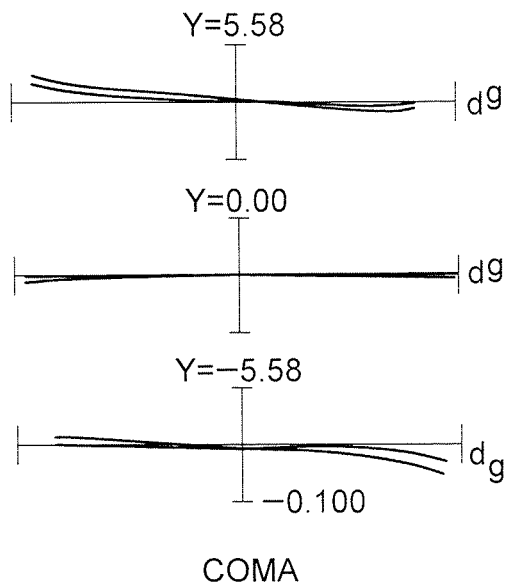
FIGS. 3A and 3B are, respectively, graphs showing meridional transverse aberrations in the wide-angle end state and the telephoto end state of the zooming optical system according to the first Example of the present application, upon focusing on infinity and vibration reduction being conducted.
Figure 3B:
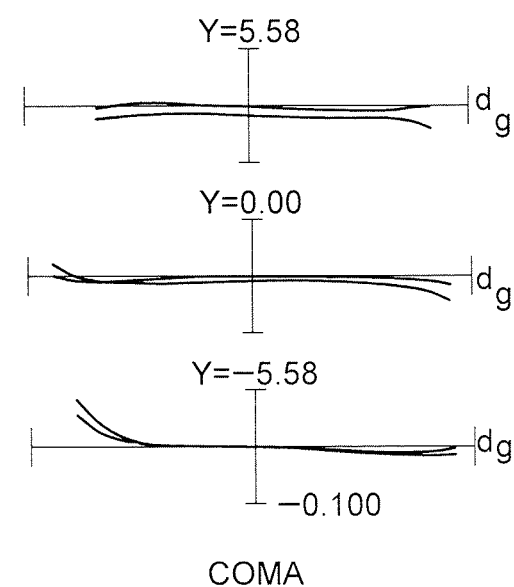

FIGS. 3A and 3B are a diagram of a meridional transverse aberration when reducing the vibration against the rotating deviation of 1.00° when focusing on the infinite-distance object in the wide-angle end state, and a diagram of the meridional transverse aberration when reducing the vibration against the rotating deviation of 0.32° when focusing on the infinite-distance object in the telephoto end state of the zooming optical system according to the first Example of the present application.

In the respective aberration diagrams, FNO represents the F-number, and Y represents the image height, d represents an aberration in the d-line (λ=587.6 nm) and g stands for an aberration in the g-line (λ=435.8 nm), respectively. In a diagram of an astigmatism, a solid line indicates a saggital image surface, and a broken line indicates a meridional image surface, respectively. Note that the same reference symbols as those in the first Example are applied to the aberration diagrams of the respective Examples that will be described later on.

It is understood from the respective aberration diagrams that the zooming optical system according to the first Example preferably corrects the various aberrations from the wide-angle end state to the telephoto end state throughout, exhibits excellent image forming performance and further exhibits the excellent image forming performance when reducing the vibrations.

Second Example

FIGS. 4A, 4B and 4C are sectional views of the zooming optical system in the wide-angle end state, the intermediate focal length state and the telephoto end state according to a second Example of the first to third embodiments of the present application.

The zooming optical system according to the second Example is configured to include, in order from an object side, a first lens group G1 having positive refractive power, a second lens group G2 having negative refractive power, a third lens group G3 having positive refractive power and a fourth lens group G4 having positive refractive power.

The first lens group G1 is configured to include, in order from the object side, a cemented lens composed of a negative meniscus lens L11 with the convex surface directed to the object side and a biconvex positive lens L12, and a positive meniscus lens L13 with the convex surface directed to the object side.

The second lens group G2 is configured to include, in order from the object side, a negative meniscus lens L21 with the convex surface directed to the object side, a biconcave negative lens L22, a biconvex positive lens L23 and a negative meniscus lens L24 with the concave surface directed to the object side. Note that the negative meniscus lens L21 positioned closest to the object side in the second lens group G2 is an aspherical lens with the object-sided lens surface being aspherical.

The third lens group G3 is configured to include, in order from the object side, a first segment group G31 having a positive refractive power and a second segment group G32 having a negative refractive power.

The first segment group G31 is configured to include, in order from the object side, a biconvex positive lens L31, and a cemented lens composed of a biconvex positive lens L32 and a biconcave negative lens L33. Note that an aperture stop S is provided between the positive lens L31 and the positive lens L32.

The second segment group G32 is configured to include, in order from the object side, only a cemented lens of a biconcave negative lens L34 and a positive meniscus lens L35 with the convex surface directed to the object side.

The fourth lens group G4 is configured to include, in order from the object side, a biconvex positive lens L41, and a cemented lens of a biconvex positive lens L42 and a negative meniscus lens L43 with the concave surface directed to the object side. Note that the positive lens L41 positioned closest to the object side in the fourth lens group G4 is an aspherical lens with the object-sided lens surface being aspherical.

Under the construction descried above, in the zooming optical system according to the second Example, when zooming to the telephoto end state from the wide-angle end state, the first lens group G1, the third lens group G3 and the fourth lens group G4 move toward the object side along the optical axis, and the second lens group G2 moves along the optical axis so that an air distance between the first lens group G1 and the second lens group G2 increases, while an air distance between the second lens group G2 and the third lens group G3 decreases, and an air distance between the third lens group G3 and the fourth lens group G4 varies. Note that the aperture stop S moves together with the third lens group G3 on this occasion.

Further, the zooming optical system according to the second Example performs focusing on the near-distance object from the infinite-distance object by moving the second lens group G2 toward the object side along the optical axis.

Moreover, the zooming optical system according to the second Example reduces the vibrations by moving only the second segment group G32 as the anti-vibration lens group so as to include the component in the direction perpendicular to the optical axis when the camera shake etc is caused.

The following Table 2 shows values of various items of data in the second Example. Herein, in the zooming optical system according to the second Example, in the wide-angle end state, the vibration reduction coefficient is −0.61, and the focal length is 10.3 (mm), and hence it follows that the moving quantity of the anti-vibration lens group for correcting the rotating deviation of 0.99° becomes 0.28 (mm). Further, in the telephoto end state, the vibration reduction coefficient is −1.42, and the focal length is 97.0 (mm), and therefore it follows that the moving quantity of the anti-vibration lens group for correcting the rotating deviation of 0.32° becomes 0.38 (mm).

TABLE 2

Second Example

[Surface Data]

| m | r | d | nd | vd |
|---|---|---|---|---|
| op | ∞ | | | |
| 1 | 214.935 | 1.600 | 1.953660 | 30.27 |
| 2 | 60.293 | 6.140 | 1.497820 | 82.51 |
| 3 | −216.386 | 0.100 | 1.000000 | |
| 4 | 59.192 | 4.825 | 1.810230 | 46.17 |
| 5 | 516.132 | d5 | 1.000000 | |
| *6 | 32.741 | 1.200 | 1.882997 | 40.76 |
| 7 | 8.577 | 4.007 | 1.000000 | |
| 8 | −15.726 | 1.200 | 1.839050 | 43.75 |
| 9 | 46.418 | 0.100 | 1.000000 | |
| 10 | 21.908 | 3.623 | 1.846660 | 23.78 |
| 11 | −16.185 | 0.601 | 1.000000 | |
| 12 | −11.861 | 1.200 | 1.882997 | 40.76 |
| 13 | −33.094 | d13 | 1.000000 | |
| 14 | 24.800 | 2.781 | 1.754999 | 52.31 |
| 15 | −39.736 | 0.500 | 1.000000 | |
| 16 | ∞ | 1.600 | 1.000000 | Aperture Stop S |
| 17 | 14.646 | 3.397 | 1.497820 | 82.51 |
| 18 | −19.677 | 1.200 | 1.852045 | 25.40 |
| 19 | 69.922 | 2.144 | 1.000000 | |
| 20 | −879.676 | 1.200 | 1.802688 | 46.87 |
| 21 | 8.771 | 2.765 | 1.876437 | 36.60 |
| 22 | 23.971 | d22 | 1.000000 | |
| *23 | 17.538 | 3.382 | 1.497820 | 82.51 |
| 24 | −22.122 | 0.100 | 1.000000 | |
| 25 | 712.073 | 4.071 | 1.625207 | 37.14 |
| 26 | −8.262 | 1.200 | 1.882997 | 40.76 |
| 27 | −97.309 | BF | 1.000000 | |
| I | ∞ | | | |

TABLE 2-continued

Second Example

[Aspherical Data]

| m | κ | A4 | A6 | A8 | A10 |
|---|---|---|---|---|---|
| 6 | 1 | 1.66E−05 | 1.53E−07 | −4.44E−09 | 5.56E−11 |
| 23 | 1 | −5.70E−05 | 6.19E−07 | | |

[Various Data]
Zooming ratio 9.42

| | W | M | T |
|---|---|---|---|
| f | 10.30 | 49.99 | 96.98 |
| FNO | 3.50 | 5.20 | 5.67 |
| 2ω | 79.71° | 17.90° | 9.37° |
| Y | 8.190 | 8.190 | 8.190 |
| TL | 89.39 | 132.08 | 150.34 |
| BF | 13.54 | 36.00 | 44.01 |
| d5 | 2.317 | 38.392 | 51.572 |
| d13 | 18.962 | 5.444 | 2.400 |
| d22 | 5.643 | 3.306 | 3.427 |

[Lens Group Data]

| | ST | f |
|---|---|---|
| G1 | 1 | 86.9 |
| G2 | 6 | −9.6 |
| G3 | 14 | 21.2 |
| G4 | 23 | 31.0 |

[Values for Conditional Expressions]

| (1) | f1/(−f2) = 9.09 |
| (2) | f3/f4 = 0.69 |
| (3) | f1/f3 = 4.10 |
| (4) | f1/f4 = 2.81 |
| (5) | |f32|/f1 = 0.40 |
| (6) | (−f2)/f3 = 0.45 |
| (7) | f31/f3 = 0.82 |

Figure 5A:
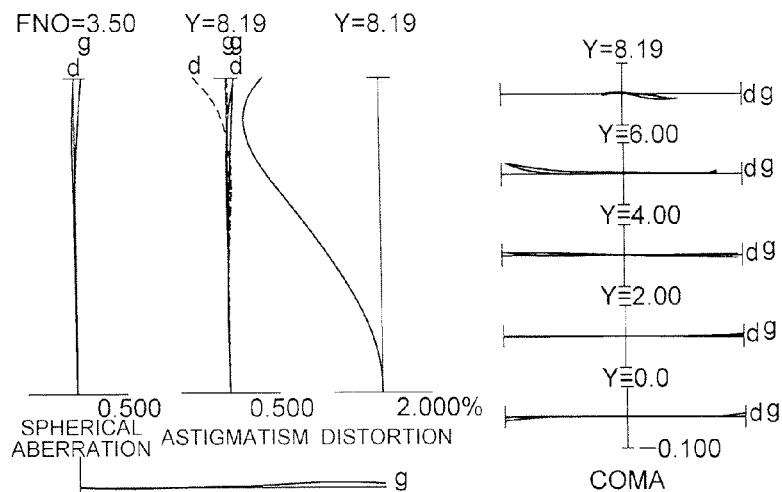
FIGS. 5A, 5B and 5C are, respectively, the graphs showing the various aberrations in the wide-angle end state, the intermediate focal length state and the telephoto end state, of the zooming optical system according to the second Example of the present application upon focusing on the infinity.
Figure 5B:
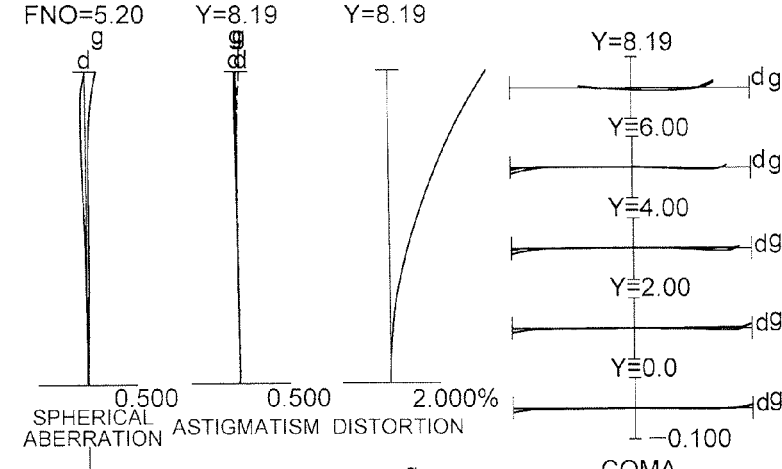
Figure 5C:
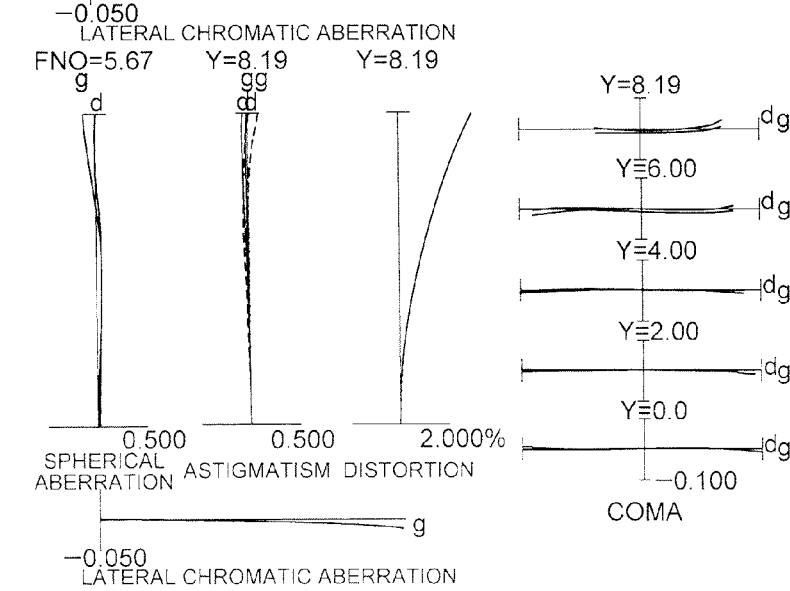

FIGS. 5A, 5B and 5C are diagrams of various aberrations when focusing on the infinite-distance object in the wide-angle end state, the intermediate focal length state and the telephoto end state of the zooming optical system according to the second Example of the present application, respectively.

Figure 6A:
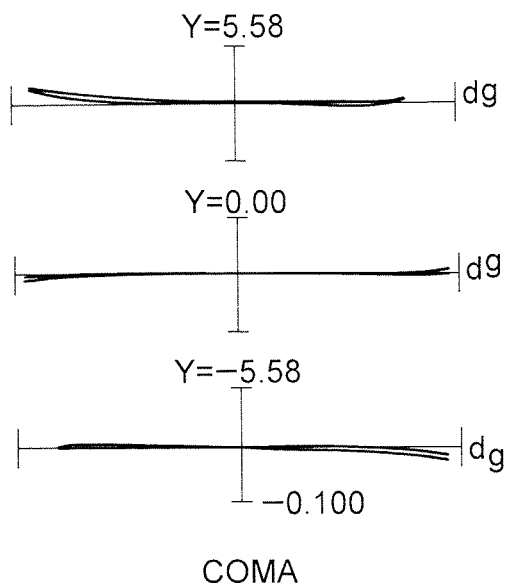
FIGS. 6A and 6B are, respectively, graphs showing meridional transverse aberrations in the wide-angle end state and the telephoto end state of the zooming optical system according to the second Example of the present application, upon focusing on infinity and vibration reduction being conducted.
Figure 6B:
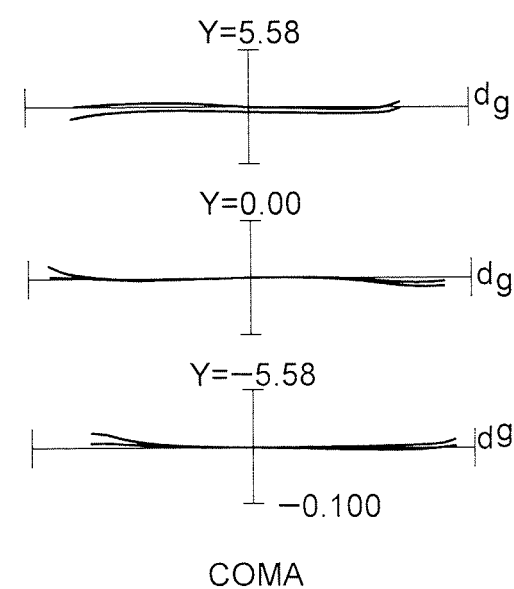

FIGS. 6A and 6B are a diagram of a meridional transverse aberration when reducing the vibration against the rotating deviation of 0.99° when focusing on the infinite-distance object in the wide-angle end state, and a diagram of the meridional transverse aberration when reducing the vibration against the rotating deviation of 0.32° when focusing on the infinite-distance object in the telephoto end state, of the zooming optical system according to the second Example of the present application.

It is understood from the respective aberration diagrams that the zooming optical system according to the second Example corrects well the various aberrations from the wide-angle end state to the telephoto end state throughout, exhibits excellent image forming performance and further exhibits the excellent image forming performance when reducing the vibrations.

Third Example

Figure 7A:
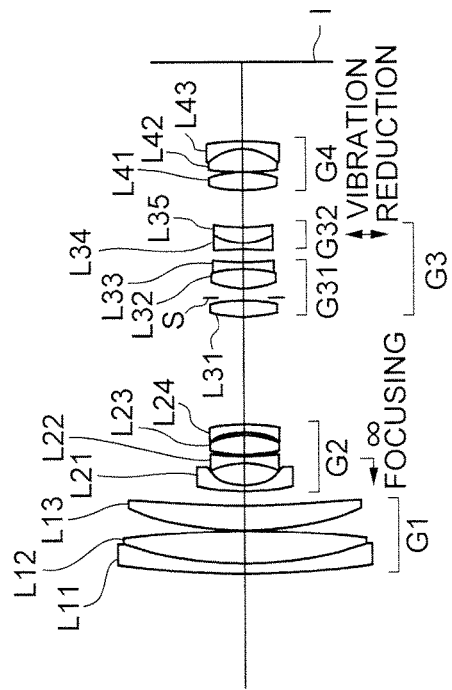
FIGS. 7A, 7B and 7C are, respectively, the sectional views in the wide-angle end state, the intermediate focal length state and the telephoto end state, of the zooming optical system according to a third Example relating to the first to third embodiments of the present application.
Figure 7B:
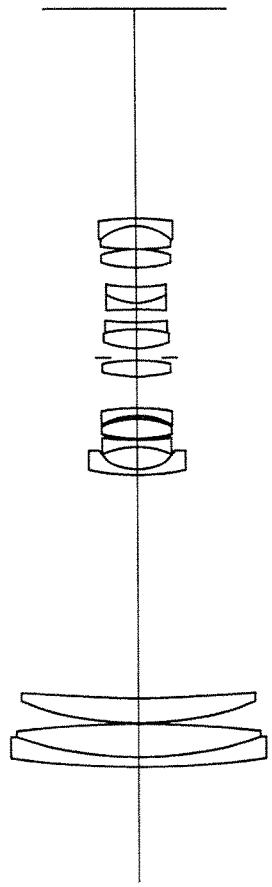
Figure 7C:
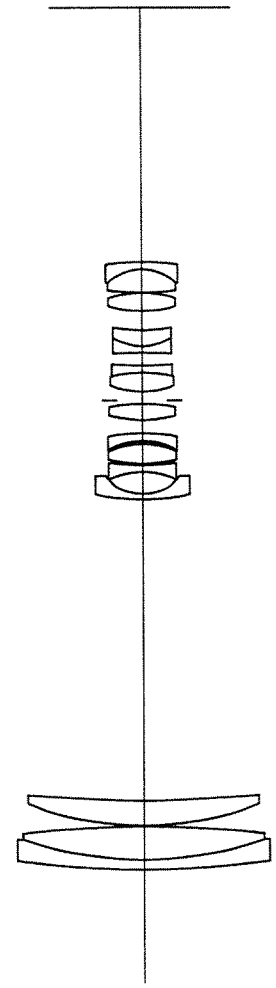

FIGS. 7A, 7B and 7C are sectional views of the zooming optical system in the wide-angle end state, the intermediate focal length state and the telephoto end state according to a third Example of the first to third embodiments of the present application.

The zooming optical system according to the third Example is configured to include, in order from an object side, a first lens group G1 having positive refractive power, a second lens group G2 having negative refractive power, a third lens group G3 having positive refractive power a the fourth lens group G4 having positive refractive power.

The first lens group G1 is configured to include, in order from the object side, a cemented lens composed of a negative meniscus lens L11 with the convex surface directed to the object side and a biconvex positive lens L12, and a positive meniscus lens L13 with the convex surface directed to the object side.

The second lens group G2 is configured to include, in order from the object side, a negative meniscus lens L21 with the convex surface directed to the object side, a biconcave negative lens L22, a biconvex positive lens L23 and a negative meniscus lens L24 with the concave surface directed to the object side. Note that the negative meniscus lens L21 positioned closest to the object side in the second lens group G2 is an aspherical lens with the object-sided lens surface being aspherical.

The third lens group G3 is configured to include, in order from the object side, a first segment group G31 having positive refractive power and a second segment group G32 having negative refractive power.

The first segment group G31 is configured to include, in order from the object side, a biconvex positive lens L31, and a cemented lens composed of a biconvex positive lens L32 and a biconcave negative lens L33. Note that an aperture stop S is provided between the positive lens L31 and the positive lens L32.

The second segment group G32 is configured to include, in order from the object side, only a cemented lens composed of a biconcave negative lens L34 and a positive meniscus lens L35 with the convex surface directed to the object side.

The fourth lens group G4 is configured to include, in order from the object side, a biconvex positive lens L41, and a cemented lens composed of a biconvex positive lens L42 and a negative meniscus lens L43 with the concave surface directed to the object side. Note that the positive lens L41 positioned closest to the object side in the fourth lens group G4 is an aspherical lens with the object-sided lens surface being aspherical.

Under the construction descried above, in the zooming optical system according to the third Example, when zooming to the telephoto end state from the wide-angle end state, the first lens group G1, the third lens group G3 and the fourth lens group G4 move toward the object side along the optical axis, and the second lens group G2 moves along the optical axis so that an air distance between the first lens group G1 and the second lens group G2 increases, while an air distance between the second lens group G2 and the third lens group G3 decreases, and an air distance between the third lens group G3 and the fourth lens group G4 varies. Note that the aperture stop S moves together with the third lens group G3 on this occasion.

Further, the zooming optical system according to the third Example performs focusing on the near-distance object from the infinite-distance object by moving the second lens group G2 toward the object side along the optical axis.

Moreover, the zooming optical system according to the third Example reduces the vibrations by moving only the second segment group G32 as the anti-vibration lens group so as to include the component in the direction perpendicular to the optical axis when the camera shake etc is caused.

The following Table 3 shows values of various items of data in the third Example. Herein, in the zooming optical system according to the third Example, in the wide-angle end state, the vibration reduction coefficient is −0.79, and the focal length is 10.3 (mm), and hence it follows that the moving quantity of the anti-vibration lens group for correcting the rotating deviation of 0.60° becomes 0.14 (mm). Further, in the telephoto end state, the vibration reduction coefficient is −1.74, and the focal length is 97.0 (mm), and therefore it follows that the moving quantity of the anti-vibration lens group for correcting the rotating deviation of 0.19° becomes 0.19 (mm).

TABLE 3

Third Example

[Surface Data]

| m | r | d | nd | vd |
|---|---|---|---|---|
| op | ∞ | | | |
| 1 | 167.891 | 1.600 | 1.950000 | 29.37 |
| 2 | 69.549 | 5.925 | 1.497820 | 82.51 |
| 3 | −183.905 | 0.100 | 1.000000 | |
| 4 | 56.184 | 4.388 | 1.729157 | 54.66 |
| 5 | 198.836 | d5 | 1.000000 | |
| *6 | 41.829 | 1.200 | 1.882997 | 40.76 |
| 7 | 8.946 | 3.756 | 1.000000 | |
| 8 | −17.431 | 1.200 | 1.864742 | 41.92 |
| 9 | 38.456 | 0.100 | 1.000000 | |
| 10 | 20.545 | 3.705 | 1.846660 | 23.78 |
| 11 | −15.937 | 0.629 | 1.000000 | |
| 12 | −11.749 | 1.200 | 1.882997 | 40.76 |
| 13 | −35.044 | d13 | 1.000000 | |
| 14 | 24.738 | 2.730 | 1.754999 | 52.31 |
| 15 | −36.975 | 0.500 | 1.000000 | |
| 16 | ∞ | 1.600 | 1.000000 | Aperture Stop S |
| 17 | 14.497 | 3.278 | 1.497820 | 82.51 |
| 18 | −19.591 | 1.200 | 1.851149 | 25.12 |
| 19 | 97.099 | 2.184 | 1.000000 | |
| 20 | −105.628 | 1.200 | 1.875733 | 41.21 |
| 21 | 8.299 | 2.780 | 1.939960 | 33.32 |
| 22 | 26.001 | d22 | 1.000000 | |
| *23 | 20.461 | 3.205 | 1.497820 | 82.51 |
| 24 | −22.765 | 0.100 | 1.000000 | |
| 25 | 175.793 | 3.930 | 1.616359 | 38.32 |
| 26 | −9.172 | 1.200 | 1.883682 | 40.65 |
| 27 | −65.712 | BF | 1.000000 | |
| I | ∞ | | | |

[Aspherical Data]

| m | κ | A4 | A6 | A8 | A10 |
|---|---|---|---|---|---|
| 6 | 1 | 1.28E−05 | 5.16E−08 | −8.45E−10 | 2.36E−11 |
| 23 | 1 | −5.71E−05 | 2.70E−07 | | |

[Various Data]
Zooming ratio 9.42

| | W | M | T |
|---|---|---|---|
| f | 10.30 | 50.00 | 97.00 |
| FNO | 3.50 | 5.20 | 5.60 |
| 2ω | 79.71° | 17.90° | 9.37° |
| Y | 8.190 | 8.190 | 8.190 |
| TL | 89.38 | 132.39 | 150.35 |
| BF | 14.01 | 36.64 | 44.30 |
| d5 | 2.319 | 39.217 | 52.463 |
| d13 | 19.087 | 5.422 | 2.400 |
| d22 | 6.245 | 3.394 | 3.481 |

[Lens Group Data]

| | ST | f |
|---|---|---|
| G1 | 1 | 88.3 |
| G2 | 6 | −9.4 |

TABLE 3-continued

Third Example

| | G3 | 14 | 21.1 |
|---|---|---|---|
| | G4 | 23 | 28.4 |

[Values for Conditional Expressions]

| (1) | f1/(−f2) = 9.41 |
|---|---|
| (2) | f3/f4 = 0.74 |
| (3) | f1/f3 = 4.18 |
| (4) | f1/f4 = 3.11 |
| (5) | |f32|/f1 = 0.31 |
| (6) | (−f2)/f3 = 0.44 |
| (7) | f31/f3 = 0.77 |

Figure 8A:
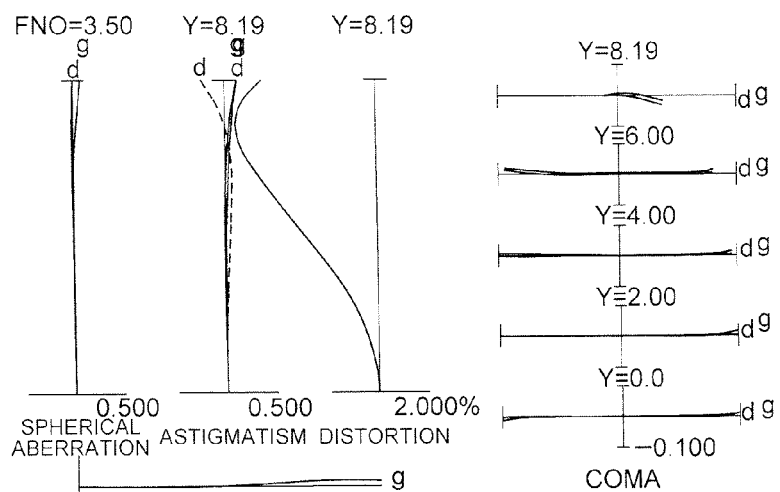
FIGS. 8A, 8B and 8C are, respectively, the graphs showing the various aberrations in the wide-angle end state, the intermediate focal length state and the telephoto end state, of the zooming optical system according to the third Example of the present application upon focusing on the infinity.
Figure 8B:
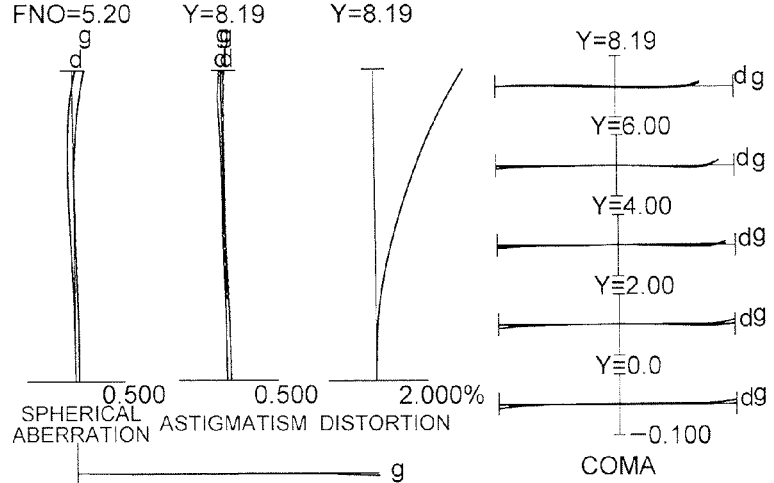
Figure 8C:
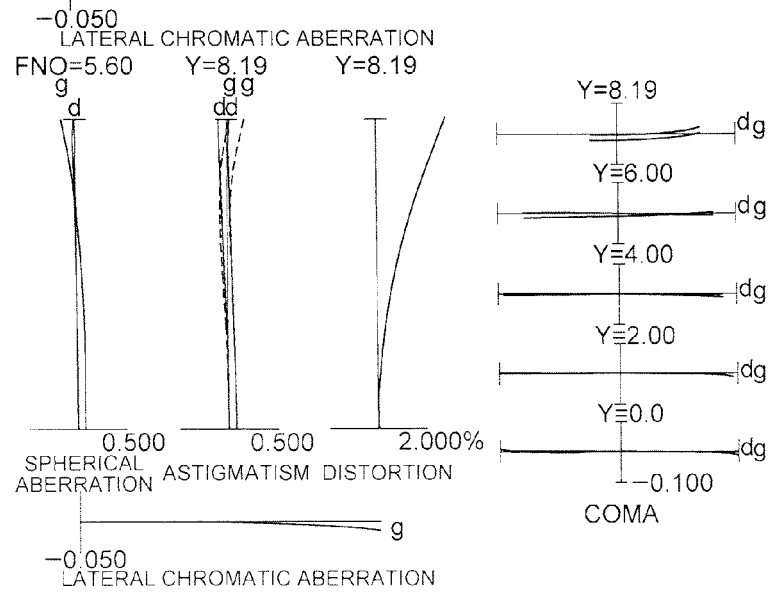

FIGS. 8A, 8B and 8C are diagrams of various aberrations when focusing on the infinite-distance object in the wide-angle end state, the intermediate focal length state and the telephoto end state of the zooming optical system according to the third Example of the present application, respectively.

Figure 9A:
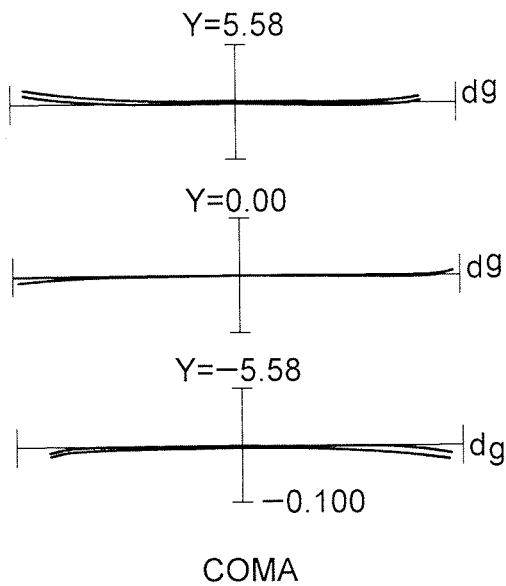
FIGS. 9A and 9B are, respectively, graphs showing meridional transverse aberrations in the wide-angle end state and the telephoto end state of the zooming optical system according to the third Example of the present application, upon focusing on infinity and vibration reduction being conducted.
Figure 9B:
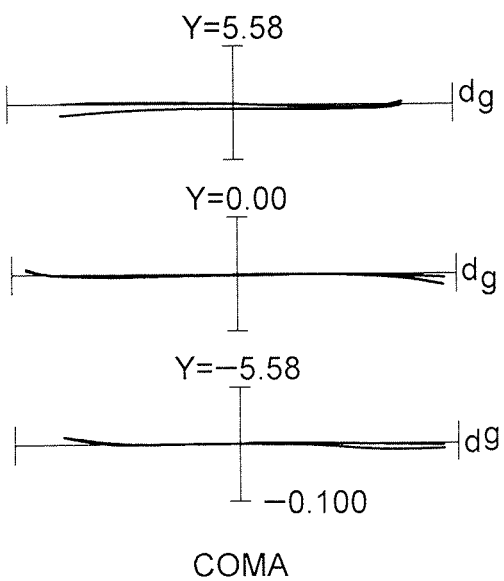

FIGS. 9A and 9B are, respectively, a diagram of a meridional transverse aberration when reducing the vibration against the rotating deviation of 0.60° when focusing on the infinite-distance object in the wide-angle end state, and a diagram of the meridional transverse aberration when reducing the vibration against the rotating deviation of 0.19° when focusing on the infinite-distance object in the telephoto end state, of the zooming optical system according to the third Example of the present application.

It is understood from the respective aberration diagrams that the zooming optical system according to the third Example preferably corrects various aberrations from the wide-angle end state to the telephoto end state throughout, exhibits excellent image forming performance and further exhibits excellent image forming performance when reducing the vibrations.

Fourth Example

Figure 10A:
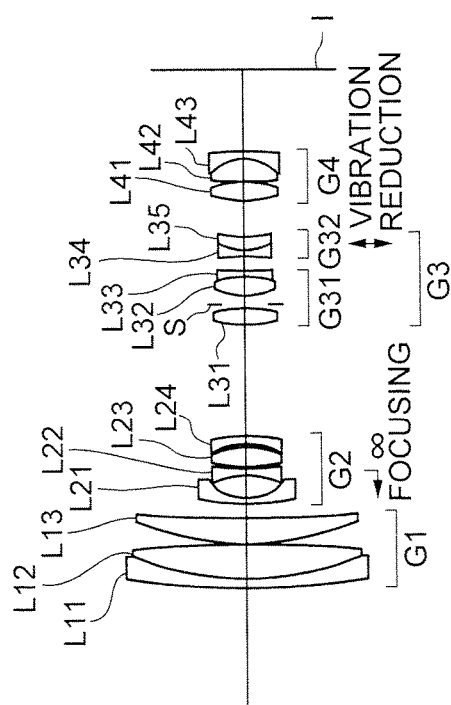
FIGS. 10A, 10B and 10C are, respectively, the sectional views in the wide-angle end state, the intermediate focal length state and the telephoto end state, of the zooming optical system according to a fourth Example relating to the first to third embodiments of the present application.
Figure 10B:
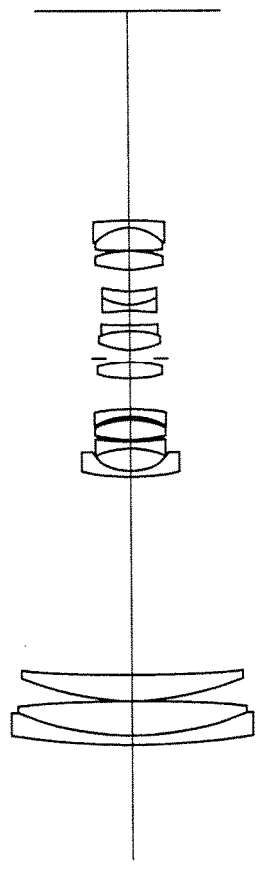
Figure 10C:
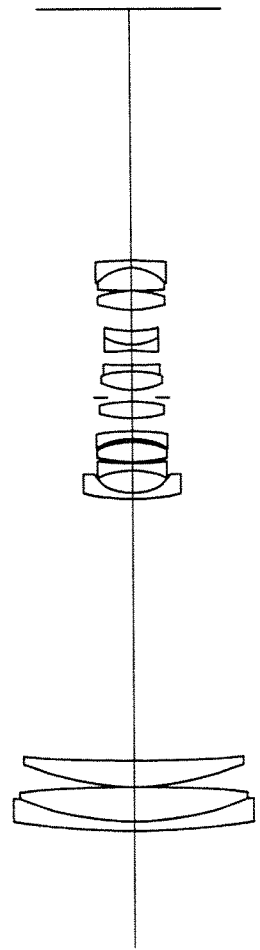

FIGS. 10A, 10B and 10C are sectional views of the zooming optical system in the wide-angle end state, the intermediate focal length state and the telephoto end state according to a fourth Example of the first to third embodiments of the present application.

The zooming optical system according to the fourth Example is configured to include, in order from an object side, a first lens group G1 having positive refractive power, a second lens group G2 having negative refractive power, a third lens group G3 having positive refractive power and a fourth lens group G4 having positive refractive power.

The first lens group G1 is configured to include, in order from the object side, a cemented lens composed of a negative meniscus lens L11 with the convex surface directed to the object side and a biconvex positive lens L12, and a positive meniscus lens L13 with the convex surface directed to the object side.

The second lens group G2 is configured to include, in order from the object side, a negative meniscus lens L21 with the convex surface directed to the object side, a biconcave negative lens L22, a biconvex positive lens L23 and a negative meniscus lens L24 with the concave surface directed to the object side. Note that the negative meniscus lens L21 positioned closest to the object side in the second lens group G2 is an aspherical lens with the object-sided lens surface being aspherical.

The third lens group G3 is configured to include, in order from the object side, a first segment group G31 having positive refractive power and a second segment group G32 having negative refractive power.

The first segment group G31 is configured to include, in order from the object side, a biconvex positive lens L31, and a cemented lens composed of a biconvex positive lens L32 and a biconcave negative lens L33. Note that the aperture stop S is provided between the positive lens L31 and the positive lens L32.

The second segment group G32 is configured to include, in order from the object side, only a cemented lens composed of a biconcave negative lens L34 and a positive meniscus lens L35 with the convex surface directed to the object side.

The fourth lens group G4 is configured to include, in order from the object side, a biconvex positive lens L41, and a cemented lens composed of a biconvex positive lens L42 and a negative meniscus lens L43 with the concave surface directed to the object side. Note that the positive lens L41 positioned closest to the object side in the fourth lens group G4 is an aspherical lens with the object-sided lens surface being aspherical.

Under the construction descried above, in the zooming optical system according to the fourth Example, when zooming to the telephoto end state from the wide-angle end state, the first lens group G1, the third lens group G3 and the fourth lens group G4 move toward the object side along the optical axis, and the second lens group G2 moves along the optical axis so that an air distance between the first lens group G1 and the second lens group G2 increases, while an air distance between the second lens group G2 and the third lens group G3 decreases, and an air distance between the third lens group G3 and the fourth lens group G4 varies. Note that the aperture stop S moves together with the third lens group G3 on this occasion.

Further, the zooming optical system according to the fourth Example performs focusing on the near-distance object from the infinite-distance object by moving the second lens group G2 toward the object side along the optical axis.

Moreover, the zooming optical system according to the fourth Example reduces the vibrations by moving only the second segment group G32 as the anti-vibration lens group so as to include the component in the direction perpendicular to the optical axis when the camera shake etc is caused.

The following Table 4 shows values of various items of data in the fourth Example. Herein, in the zooming optical system according to the fourth Example, in the wide-angle end state, the vibration reduction coefficient is −0.75, and the focal length is 10.3 (mm), and hence it follows that the moving quantity of the anti-vibration lens group for correcting the rotating deviation of 0.60° becomes 0.14 (mm). Further, in the telephoto end state, the vibration reduction coefficient is −1.62, and the focal length is 97.0 (mm), and therefore it follows that the moving quantity of the anti-vibration lens group for correcting the rotating deviation of 0.19° becomes 0.20 (mm).

TABLE 4

Fourth Example

[Surface Data]

| m | r | d | nd | vd |
|---|---|---|---|---|
| op | ∞ | | | |
| 1 | 134.035 | 1.600 | 1.995973 | 28.75 |
| 2 | 56.255 | 5.824 | 1.497820 | 82.51 |

TABLE 4-continued

Fourth Example

| | | | | |
|---|---|---|---|---|
| 3 | −238.373 | 0.100 | 1.000000 | |
| 4 | 50.086 | 4.577 | 1.772927 | 50.05 |
| 5 | 242.611 | d5 | 1.000000 | |
| *6 | 57.243 | 1.200 | 1.878662 | 37.67 |
| 7 | 8.942 | 3.645 | 1.000000 | |
| 8 | −17.572 | 1.200 | 1.882997 | 40.76 |
| 9 | 43.025 | 0.100 | 1.000000 | |
| 10 | 20.980 | 3.779 | 1.810399 | 22.65 |
| 11 | −15.077 | 0.580 | 1.000000 | |
| 12 | −11.668 | 1.200 | 1.882997 | 40.76 |
| 13 | −30.843 | d13 | 1.000000 | |
| 14 | 22.438 | 2.768 | 1.754910 | 52.33 |
| 15 | −41.025 | 0.500 | 1.000000 | |
| 16 | ∞ | 1.600 | 1.000000 | Aperture Stop S |
| 17 | 14.301 | 3.206 | 1.497820 | 82.51 |
| 18 | −21.553 | 1.200 | 1.970527 | 23.71 |
| 19 | 96.060 | 2.155 | 1.000000 | |
| 20 | −149.641 | 1.200 | 1.882794 | 40.61 |
| 21 | 10.106 | 2.398 | 2.002300 | 28.33 |
| 22 | 24.619 | d22 | 1.000000 | |
| *23 | 20.677 | 3.184 | 1.593190 | 67.90 |
| 24 | −23.793 | 0.100 | 1.000000 | |
| 25 | 610.600 | 3.859 | 1.605665 | 39.91 |
| 26 | −8.915 | 1.200 | 1.890148 | 39.59 |
| 27 | −90.902 | BF | 1.000000 | |
| I | ∞ | | | |

[Aspherical Data]

| m | κ | A4 | A6 | A8 | A10 |
|---|---|---|---|---|---|
| 6 | 1 | 1.55E−05 | −9.41E−08 | 2.04E−09 | −1.22E−12 |
| 23 | 1 | −4.75E−05 | 3.47E−07 | | |

[Various Data]
Zooming ratio 9.42

| | W | M | T |
|---|---|---|---|
| f | 10.30 | 50.00 | 97.01 |
| FNO | 3.50 | 5.20 | 5.60 |
| 2ω | 79.71° | 17.90° | 9.37° |
| Y | 8.190 | 8.190 | 8.190 |
| TL | 89.33 | 125.89 | 140.87 |
| BF | 14.18 | 36.03 | 42.68 |
| d5 | 2.328 | 33.549 | 45.003 |
| d13 | 19.446 | 5.642 | 2.400 |
| d22 | 6.199 | 3.500 | 3.615 |

[Lens Group Data]

| | ST | f |
|---|---|---|
| G1 | 1 | 76.4 |
| G2 | 6 | −9.3 |
| G3 | 14 | 21.8 |
| G4 | 23 | 28.5 |

[Values for Conditional Expressions]

| (1) | f1/(−f2) = 8.25 |
|---|---|
| (2) | f3/f4 = 0.76 |
| (3) | f1/f3 = 3.51 |
| (4) | f1/f4 = 2.68 |
| (5) | |f32|/f1 = 0.38 |
| (6) | (−f2)/f3 = 0.43 |
| (7) | f31/f3 = 0.78 |

Figure 11A:
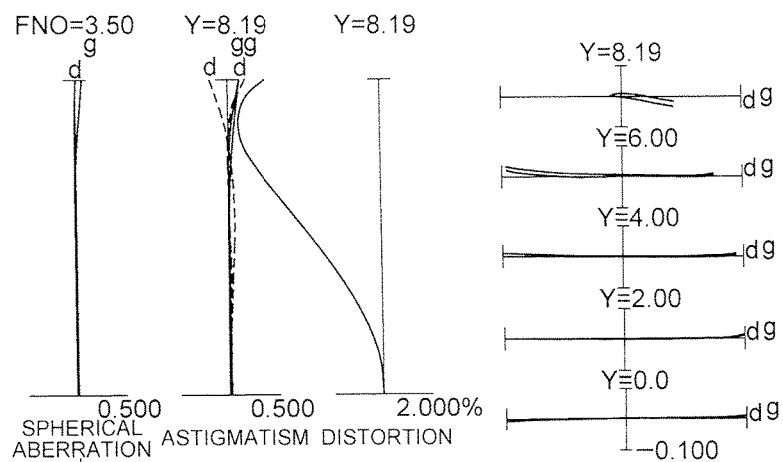
FIGS. 11A, 11B and 11C are, respectively, the graphs showing the various aberrations in the wide-angle end state, the intermediate focal length state and the telephoto end state, of the zooming optical system according to the fourth Example of the present application upon focusing on the infinity.
Figure 11B:
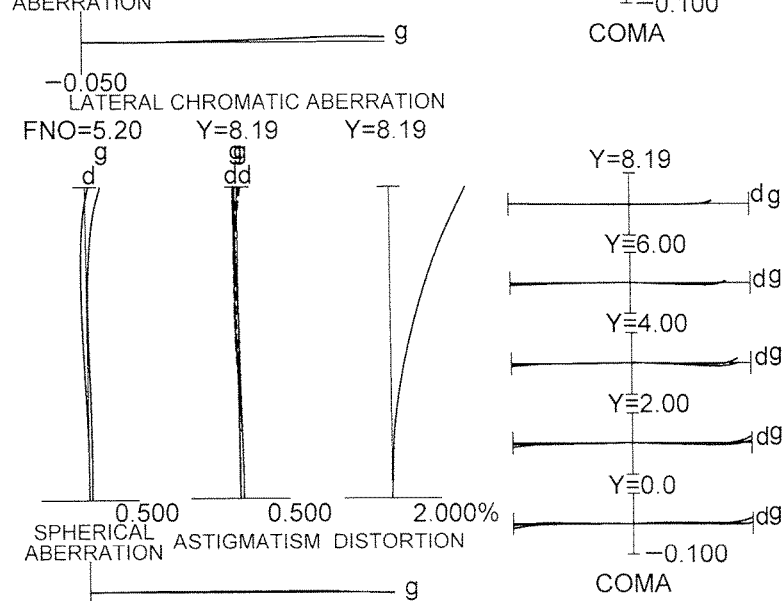
Figure 11C:
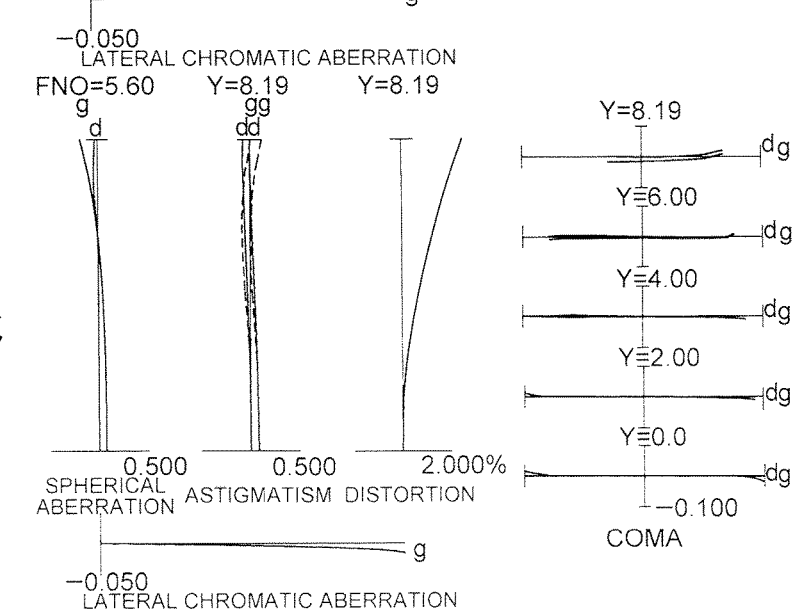

FIGS. 11A, 11B and 11C are diagrams of various aberrations when focusing on the infinite-distance object in the wide-angle end state, the intermediate focal length state and the telephoto end state of the zooming optical system according to the fourth Example of the present application, respectively.

Figure 12A:
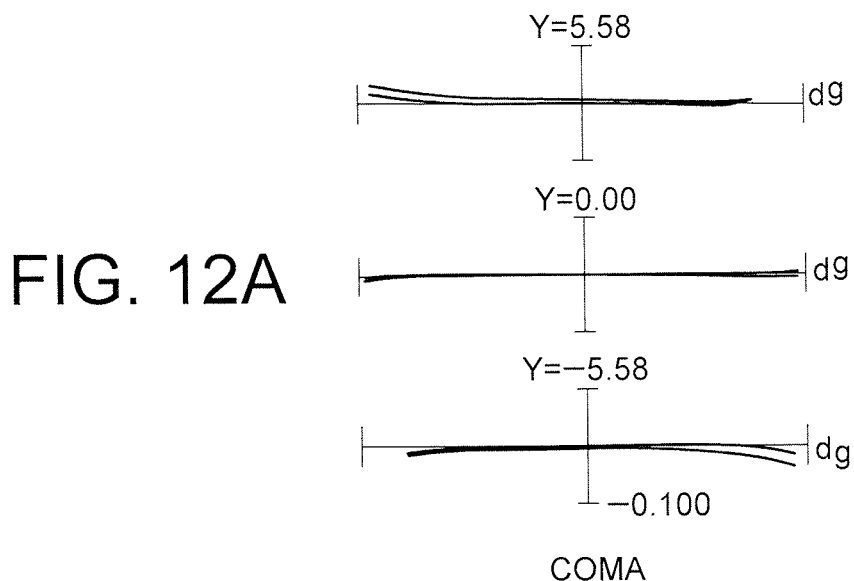
FIGS. 12A and 12B are, respectively, graphs showing meridional transverse aberrations in the wide-angle end state and the telephoto end state of the zooming optical system according to the fourth Example of the present application, upon focusing on infinity and vibration reduction being conducted.
Figure 12B:
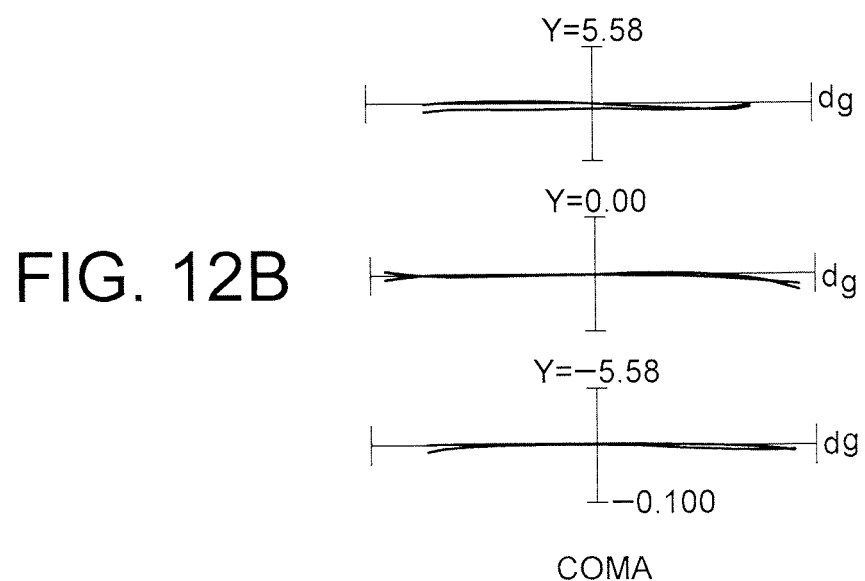

FIGS. 12A and 12B are, respectively, a diagram of a meridional transverse aberration when reducing the vibration against the rotating deviation of 0.60° when focusing on the infinite-distance object in the wide-angle end state, and a diagram of the meridional transverse aberration when reducing the vibration against the rotating deviation of 0.19° when focusing on the infinite-distance object in the telephoto end state, of the zooming optical system according to the fourth Example of the present application.

It is understood from the respective aberration diagrams that the zooming optical system according to the fourth Example corrects well the various aberrations from the wide-angle end state to the telephoto end state throughout, exhibits excellent image forming performance and further exhibits excellent image forming performance when reducing the vibrations.

Fifth Example

Figures 13A, 13B, 13C:
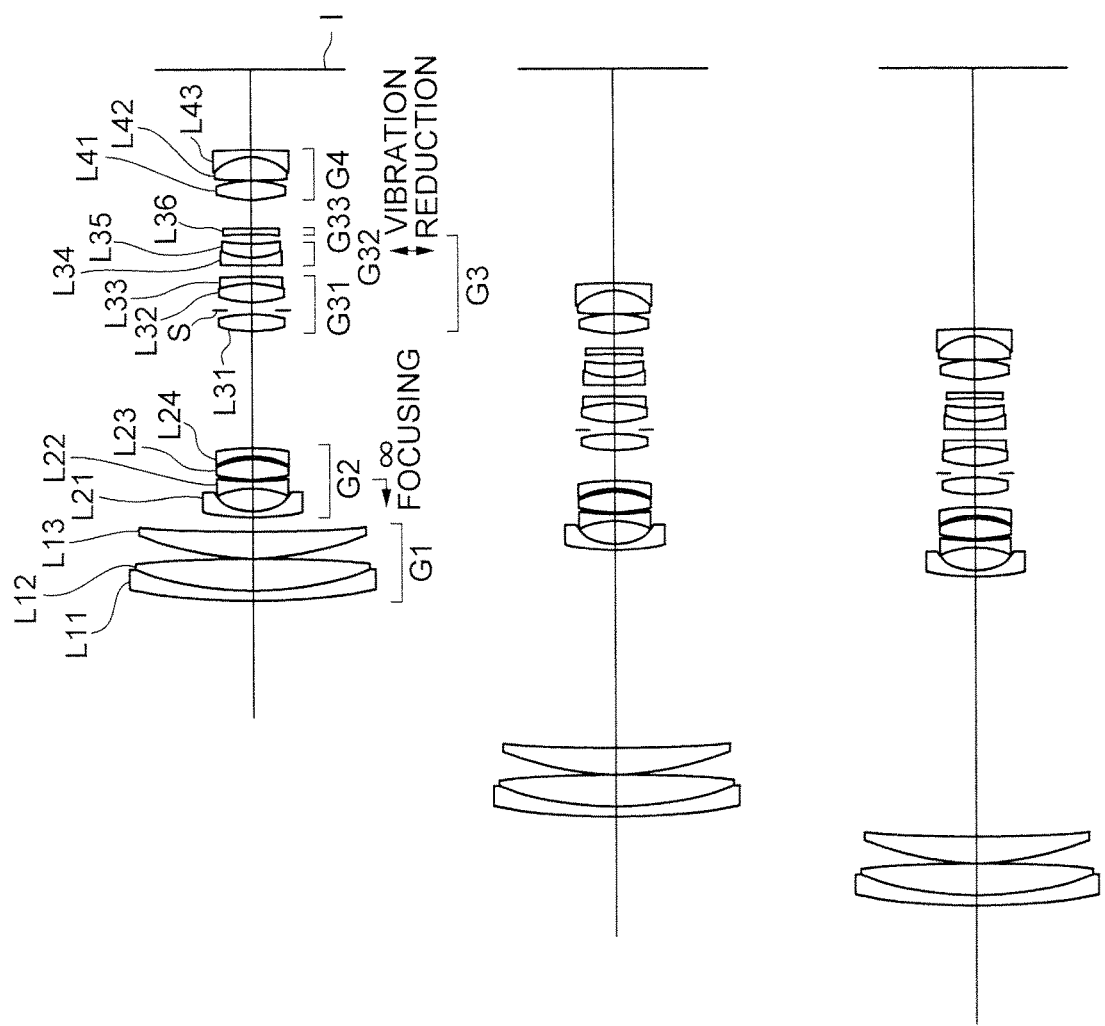
FIGS. 13A, 13B and 13C are, respectively, the sectional views in the wide-angle end state, the intermediate focal length state and the telephoto end state, of the zooming optical system according to a fifth Example relating to the first to third embodiments of the present application.

FIGS. 13A, 13B and 13C are sectional views of the zooming optical system in the wide-angle end state, the intermediate focal length state and the telephoto end state according to a fifth Example of the first to third embodiments of the present application.

The zooming optical system according to the fifth Example is configured to include, in order from an object side, a first lens group G1 having positive refractive power, a second lens group G2 having negative refractive power, a third lens group G3 having positive refractive power and a fourth lens group G4 having positive refractive power.

The first lens group G1 is configured to include, in order from the object side, a cemented lens composed of a negative meniscus lens L11 with the convex surface directed to the object side and the biconvex positive lens L12, and a positive meniscus lens L13 with the convex surface directed to the object side.

The second lens group G2 is configured to include, in order from the object side, a negative meniscus lens L21 with the convex surface directed to the object side, a biconcave negative lens L22, a biconvex positive lens L23 and a negative meniscus lens L24 with the concave surface directed to the object side. Note that the negative meniscus lens L21 positioned closest to the object side in the second lens group G2 is an aspherical lens with the object-sided lens surface being aspherical.

The third lens group G3 is configured to include, in order from the object side, a first segment group G31 having positive refractive power, a second segment group G32 having negative refractive power and a third segment group G33 having the negative refractive power.

The first segment group G31 is configured to include, in order from the object side, a biconvex positive lens L31, and a cemented lens composed of a biconvex positive lens L32 and a negative meniscus lens L33 with the concave surface directed to the object side. Note that an aperture stop S is provided between the positive lens L31 and the positive lens L32.

The second segment group G32 is configured to include, in order from the object side, only a cemented lens of a biconcave negative lens L34 and a positive meniscus lens L35 with the convex surface directed to the object side. The third segment group G33 is configured to include only a biconcave negative lens L36.

The fourth lens group G4 is configured to include, in order from the object side, a biconvex positive lens L41, and a cemented lens composed of a positive meniscus lens L42 with the concave surface directed to the object side and a negative meniscus lens L43 with the concave surface directed to the object side. Note that the positive lens L41 positioned closest to the object side in the fourth lens group G4 is an aspherical lens with the object-sided lens surface being aspherical.

Under the construction descried above, in the zooming optical system according to the fifth Example, when zooming to the telephoto end state from the wide-angle end state, the first lens group G1, the third lens group G3 and the fourth lens group G4 move toward the object side along the optical axis, and the second lens group G2 moves along the optical axis so that an air distance between the first lens group G1 and the second lens group G2 increases, while an air distance between the second lens group G2 and the third lens group G3 decreases, and an air distance between the third lens group G3 and the fourth lens group G4 varies. Note that the aperture stop S moves together with the third lens group G3 on this occasion.

Further, the zooming optical system according to the fifth Example performs focusing on the near-distance object from the infinite-distance object by moving the second lens group G2 toward the object side along the optical axis.

Moreover, the zooming optical system according to the fifth Example reduces the vibrations by moving only the second segment group G32 as the anti-vibration lens group so as to include the component in the direction perpendicular to the optical axis when the camera shake etc is caused.

The following Table 5 shows values of various items of data in the fifth Example. Herein, in the zooming optical system according to the fifth Example, in the wide-angle end state, the vibration reduction coefficient is −0.67, and the focal length is 10.3 (mm), and hence it follows that the moving quantity of the anti-vibration lens group for correcting the rotating deviation of 0.60° becomes 0.16 (mm). Further, in the telephoto end state, the vibration reduction coefficient is −1.45, and the focal length is 97.0 (mm), and therefore it follows that the moving quantity of the anti-vibration lens group for correcting the rotating deviation of 0.19° becomes 0.23 (mm).

TABLE 5

Fifth Example

[Surface Data]

| m | r | d | nd | vd |
|---|---|---|---|---|
| op | ∞ | | | |
| 1 | 121.433 | 1.600 | 2.000942 | 28.06 |
| 2 | 56.973 | 5.569 | 1.497820 | 82.51 |
| 3 | −262.775 | 0.100 | 1.000000 | |
| 4 | 50.394 | 4.472 | 1.757194 | 52.03 |
| 5 | 230.587 | d5 | 1.000000 | |
| *6 | 60.994 | 1.200 | 1.874937 | 35.34 |
| 7 | 8.965 | 3.574 | 1.000000 | |
| 8 | −18.928 | 1.200 | 1.882997 | 40.76 |
| 9 | 40.750 | 0.100 | 1.000000 | |
| 10 | 20.638 | 3.681 | 1.831265 | 21.76 |
| 11 | −16.433 | 0.539 | 1.000000 | |
| 12 | −12.501 | 1.200 | 1.882997 | 40.76 |
| 13 | −37.209 | d13 | 1.000000 | |
| 14 | 22.437 | 2.755 | 1.747287 | 52.75 |
| 15 | −40.608 | 0.500 | 1.000000 | |
| 16 | ∞ | 1.600 | 1.000000 | Aperture Stop S |
| 17 | 14.529 | 3.193 | 1.497820 | 82.51 |
| 18 | −21.393 | 1.200 | 1.959603 | 22.45 |
| 19 | −244.270 | 2.040 | 1.000000 | |
| 20 | −109.243 | 1.200 | 1.882997 | 40.76 |
| 21 | 11.581 | 2.339 | 1.964773 | 29.62 |
| 22 | 31.145 | 1.462 | 1.000000 | |
| 23 | −57.166 | 1.000 | 1.875553 | 35.71 |
| 24 | 96.176 | d24 | 1.000000 | |
| *25 | 19.938 | 3.197 | 1.593190 | 67.90 |

TABLE 5-continued

Fifth Example

| 26 | −24.778 | 0.100 | 1.000000 | |
|---|---|---|---|---|
| 27 | −825.810 | 3.984 | 1.614364 | 38.61 |
| 28 | −8.826 | 1.200 | 1.891733 | 39.34 |
| 29 | −44.568 | BF | 1.000000 | |
| I | ∞ | | | |

[Aspherical Data]

| m | κ | A4 | A6 | A8 | A10 |
|---|---|---|---|---|---|
| 6 | 1 | 1.18E−05 | −7.24E−08 | 6.90E−10 | 5.95E−12 |
| 25 | 1 | −6.37E−05 | 4.69E−07 | | |

[Various Data]
Zooming ratio 9.42

| | W | M | T |
|---|---|---|---|
| f | 10.30 | 50.00 | 97.00 |
| FNO | 3.50 | 5.20 | 5.59 |
| 2ω | 79.72° | 18.05° | 9.42° |
| Y | 8.190 | 8.190 | 8.190 |
| TL | 89.33 | 125.73 | 140.86 |
| BF | 13.31 | 35.58 | 42.88 |
| d5 | 2.329 | 33.140 | 44.235 |
| d13 | 19.776 | 5.702 | 2.400 |
| d24 | 4.905 | 2.300 | 2.341 |

[Lens Group Data]

| | ST | f |
|---|---|---|
| G1 | 1 | 75.9 |
| G2 | 6 | −9.2 |
| G3 | 14 | 20.7 |
| G4 | 25 | 23.8 |

[Values for Conditional Expressions]

| (1) | f1/(−f2) = 8.24 |
| (2) | f3/f4 = 0.87 |
| (3) | f1/f3 = 3.66 |
| (4) | f1/f4 = 3.19 |
| (5) | |f32|/f1 = 0.41 |
| (6) | (−f2)/f3 = 0.44 |
| (7) | f31/f3 = 0.71 |

Figure 14A:
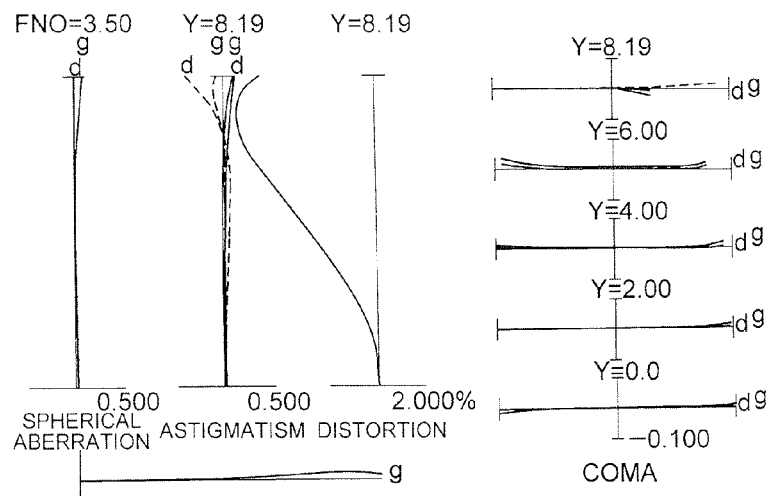
FIGS. 14A, 14B and 14C are, respectively, the graphs showing the various aberrations in the wide-angle end state, the intermediate focal length state and the telephoto end state, of the zooming optical system according to the fifth Example of the present application upon focusing on the infinity.
Figure 14B:
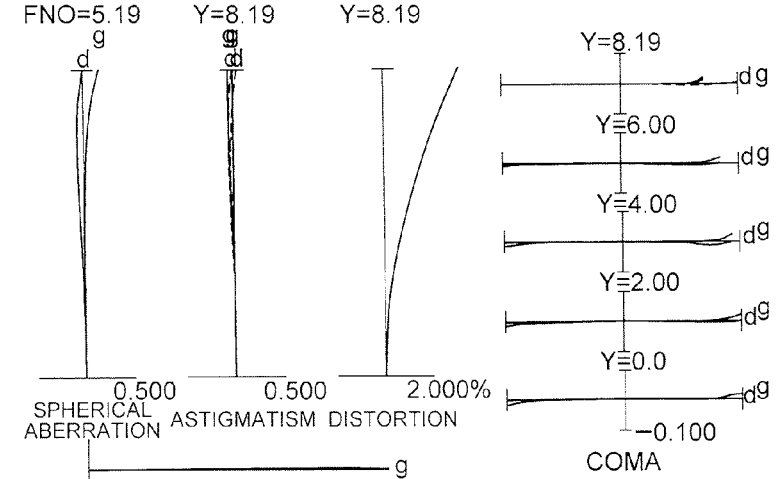
Figure 14C:
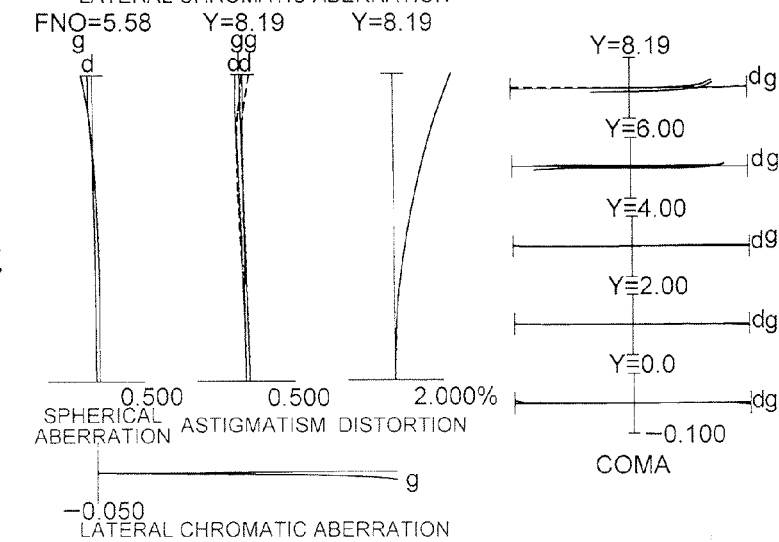

FIGS. 14A, 14B and 14C are diagrams of various aberrations when focusing on the infinite-distance object in the wide-angle end state, the intermediate focal length state and the telephoto end state of the zooming optical system according to the fifth Example of the present application, respectively.

Figure 15A:
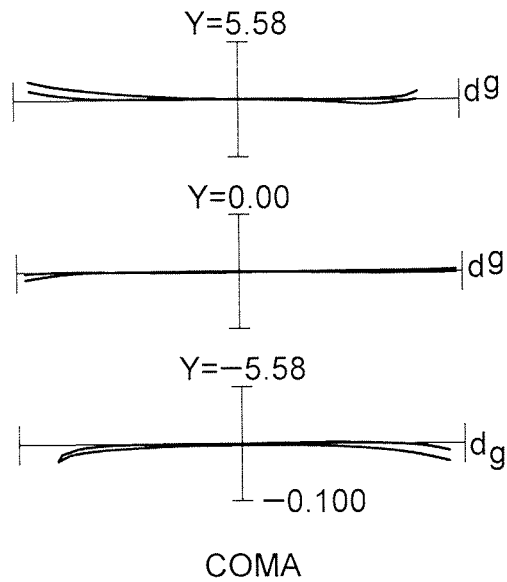
FIGS. 15A and 15B are, respectively, graphs showing meridional transverse aberrations in the wide-angle end state and the telephoto end state of the zooming optical system according to the fifth Example of the present application, upon focusing on infinity and vibration reduction being conducted.
Figure 15B:
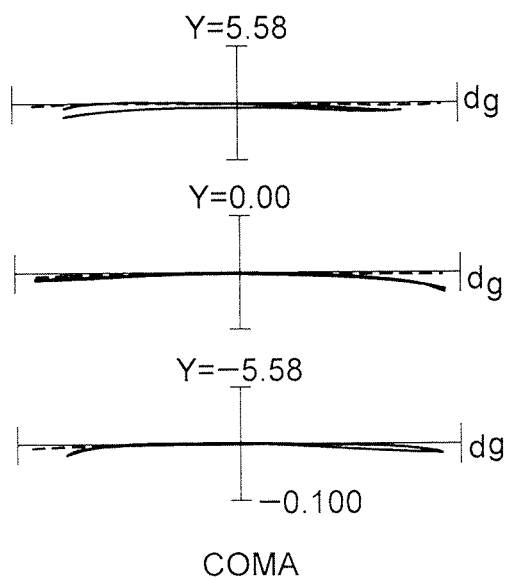

FIGS. 15A and 15B are, respectively, a diagram of a meridional transverse aberration when reducing the vibration against the rotating deviation of 0.60° when focusing on the infinite-distance object in the wide-angle end state, and a diagram of the meridional transverse aberration when reducing the vibration against the rotating deviation of 0.19° when focusing on the infinite-distance object in the telephoto end state of the zooming optical system according to the fifth Example of the present application.

It is understood from the respective aberration diagrams that the zooming optical system according to the fifth Example corrects well various aberrations from the wide-angle end state to the telephoto end state throughout, exhibits excellent image forming performance and further exhibits excellent image forming performance when reducing the vibrations.

Sixth Example

FIGS. 16A, 16B and 16C are sectional views of the zooming optical system in the wide-angle end state, the intermediate focal length state and the telephoto end state according to a sixth Example of the first to third embodiments of the present application.

The zooming optical system according to the sixth Example is configured to include, in order from an object side, a first lens group G1 having positive refractive power, a second lens group G2 having negative refractive power, a third lens group G3 having positive refractive power, a fourth lens group G4 having positive refractive power and a fifth lens group G5 having negative refractive power.

The first lens group G1 is configured to include, in order from the object side, a cemented lens composed of a negative meniscus lens L11 with the convex surface directed to the object side and a biconvex positive lens L12, and a positive meniscus lens L13 with the convex surface directed to the object side.

The second lens group G2 is configured to include, in order from the object side, a negative meniscus lens L21 with the convex surface directed to the object side, a biconcave negative lens L22, a biconvex positive lens L23 and a negative meniscus lens L24 with the concave surface directed to the object side. Note that the negative meniscus lens L21 positioned closest to the object side in the second lens group G2 is an aspherical lens with the object-sided lens surface being aspherical.

The third lens group G3 is configured to include, in order from the object side, a first segment group G31 having positive refractive power and a second segment group G32 having negative refractive power.

The first segment group G31 is configured to include, in order from the object side, a biconvex positive lens L31, and a cemented lens composed of a biconvex positive lens L32 and a biconcave negative lens L33. Note that an aperture stop S is provided between the positive lens L31 and the positive lens L32.

The second segment group G32 is configured to include, in order from the object side, only a cemented lens composed of a biconcave negative lens L34 and a positive meniscus lens L35 with the convex surface directed to the object side. The fourth lens group G4 is configured to include only a biconvex positive lens L41. Note that the positive lens L41 is an aspherical lens with the object-sided lens surface being aspherical.

The fifth lens group G5 is configured to include, in order from the object side, only a cemented lens composed of a positive meniscus lens L51 with the concave surface directed to the object side and a negative meniscus lens L52 with the concave surface directed to the object side.

Under the construction descried above, in the zooming optical system according to the sixth Example, when zooming to the telephoto end state from the wide-angle end state, the first lens group G1, the third lens group G3, the fourth lens group G4 and the fifth lens group G5 move toward the object side along the optical axis, and the second lens group G2 moves along the optical axis so that an air distance between the first lens group G1 and the second lens group G2 increases, an air distance between the second lens group G2 and the third lens group G3 decreases, an air distance between the third lens group G3 and the fourth lens group G4 decreases, and an air distance between the fourth lens group G4 and the fifth lens group G5 increases. Note that the aperture stop S moves together with the third lens group G3 on this occasion.

Further, the zooming optical system according to the sixth Example performs focusing on the near-distance object from the infinite-distance object by moving the second lens group G2 toward the object side along the optical axis.

Moreover, the zooming optical system according to the sixth Example reduces the vibrations by moving only the second segment group G32 as the anti-vibration lens group so as to include the component in the direction perpendicular to the optical axis when the camera shake etc is caused.

The following Table 6 shows values of various items of data in the sixth Example. Herein, in the zooming optical system according to the sixth Example, in the wide-angle end state, the vibration reduction coefficient is −0.67, and the focal length is 10.3 (mm), and hence it follows that the moving quantity of the anti-vibration lens group for correcting the rotating deviation of 0.60° becomes 0.16 (mm). Further, in the telephoto end state, the vibration reduction coefficient is −1.48, and the focal length is 97.0 (mm), and therefore it follows that the moving quantity of the anti-vibration lens group for correcting the rotating deviation of 0.19° becomes 0.22 (mm).

TABLE 6

Sixth Example

[Surface Data]

| m | r | d | nd | vd |
|---|---|---|----|----|
| op | ∞ | | | |
| 1 | 130.000 | 1.600 | 1.977550 | 30.05 |
| 2 | 53.215 | 5.870 | 1.497820 | 82.51 |
| 3 | −301.577 | 0.100 | 1.000000 | |
| 4 | 49.766 | 4.706 | 1.762484 | 51.33 |
| 5 | 285.082 | d5 | 1.000000 | |
| *6 | 55.053 | 1.200 | 1.875647 | 35.77 |
| 7 | 8.920 | 3.605 | 1.000000 | |
| 8 | −18.863 | 1.200 | 1.882997 | 40.76 |
| 9 | 38.238 | 0.100 | 1.000000 | |
| 10 | 20.860 | 3.659 | 1.830156 | 21.81 |
| 11 | −16.640 | 0.611 | 1.000000 | |
| 12 | −12.286 | 1.200 | 1.882997 | 40.76 |
| 13 | −32.821 | d13 | 1.000000 | |
| 14 | 22.276 | 2.832 | 1.723962 | 54.17 |
| 15 | −39.179 | 0.500 | 1.000000 | |
| 16 | ∞ | 1.600 | 1.000000 | Aperture Stop S |
| 17 | 14.822 | 3.235 | 1.497820 | 82.51 |
| 18 | −21.400 | 1.200 | 1.966413 | 23.23 |
| 19 | 294.782 | 2.124 | 1.000000 | |
| 20 | −97.585 | 1.200 | 1.881100 | 39.35 |
| 21 | 10.629 | 2.457 | 1.993396 | 28.92 |
| 22 | 30.804 | d22 | 1.000000 | |
| *23 | 24.645 | 2.816 | 1.593190 | 67.90 |
| 24 | −36.143 | d24 | 1.000000 | |
| 25 | −1303.485 | 3.950 | 1.602810 | 40.36 |
| 26 | −8.782 | 1.200 | 1.897219 | 38.51 |
| 27 | −45.532 | BF | 1.000000 | |
| I | ∞ | | | |

[Aspherical Data]

| m | κ | A4 | A6 | A8 | A10 |
|---|---|----|----|----|-----|
| 6 | 1 | 1.59E−05 | −5.02E−08 | 1.14E−10 | 9.01E−12 |
| 23 | 1 | −4.32E−05 | 2.52E−07 | | |

[Various Data]
Zooming ratio 9.42

| | W | M | T |
|---|---|---|---|
| f | 10.30 | 50.00 | 97.00 |
| FNO | 3.50 | 5.17 | 5.63 |
| 2ω | 79.71° | 18.02° | 9.43° |
| Y | 8.190 | 8.190 | 8.190 |
| TL | 89.33 | 125.31 | 140.86 |
| BF | 13.25 | 33.66 | 41.71 |

TABLE 6-continued

Sixth Example

| d5 | 2.328 | 34.196 | 44.867 |
|---|---|---|---|
| d13 | 19.888 | 5.725 | 2.400 |
| d22 | 6.801 | 3.500 | 3.502 |
| d24 | 0.100 | 1.265 | 1.411 |

[Lens Group Data]

|  | ST | f |
|---|---|---|
| G1 | 1 | 77.2 |
| G2 | 6 | −9.3 |
| G3 | 14 | 20.3 |
| G4 | 23 | 25.1 |
| G5 | 25 | −72.1 |

[Values for Conditional Expressions]

| (1) | f1/(−f2) = 8.34 |
|---|---|
| (2) | f3/f4 = 0.82 |
| (3) | f1/f3 = 3.76 |
| (4) | f1/f4 = 3.07 |
| (5) | |f32|/f1 = 0.42 |
| (6) | (−f2)/f3 = 0.45 |
| (7) | f31/f3 = 0.79 |

Figure 17A:
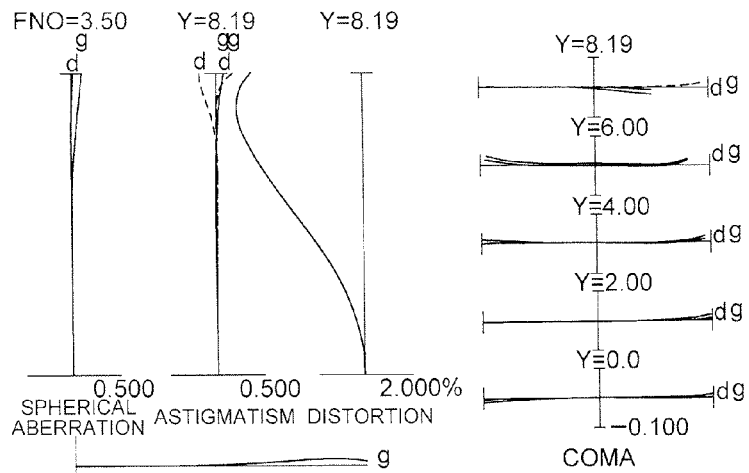
FIGS. 17A, 17B and 17C are, respectively, the graphs showing the various aberrations in the wide-angle end state, the intermediate focal length state and the telephoto end state, of the zooming optical system according to the sixth Example of the present application upon focusing on the infinity.
Figure 17B:
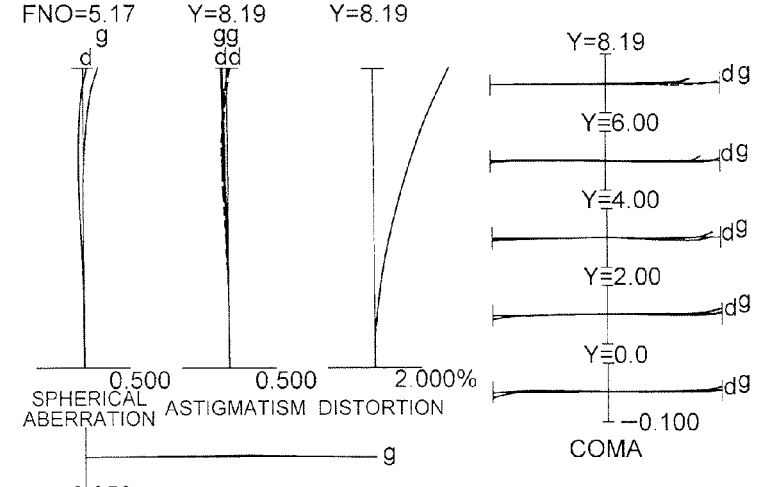
Figure 17C:
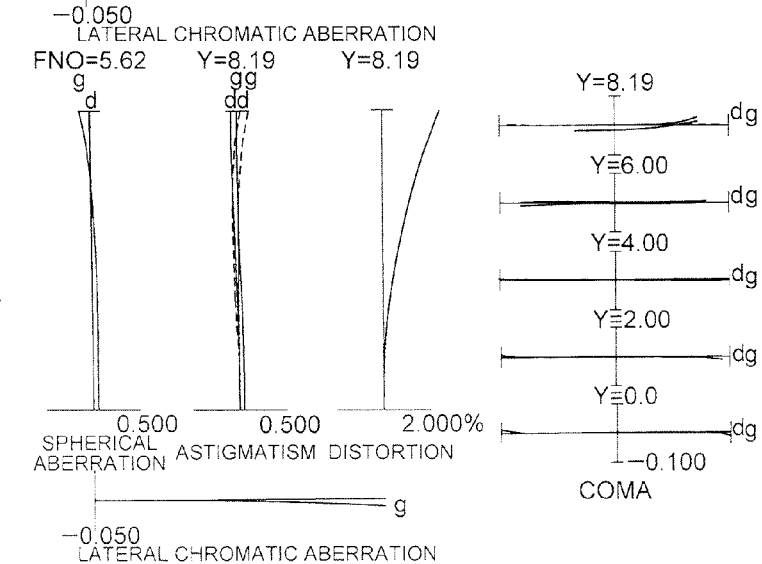

FIGS. 17A, 17B and 17C are diagrams of various aberrations when focusing on the infinite-distance object in the wide-angle end state, the intermediate focal length state and the telephoto end state of the zooming optical system according to the sixth Example of the present application, respectively.

Figure 18A:
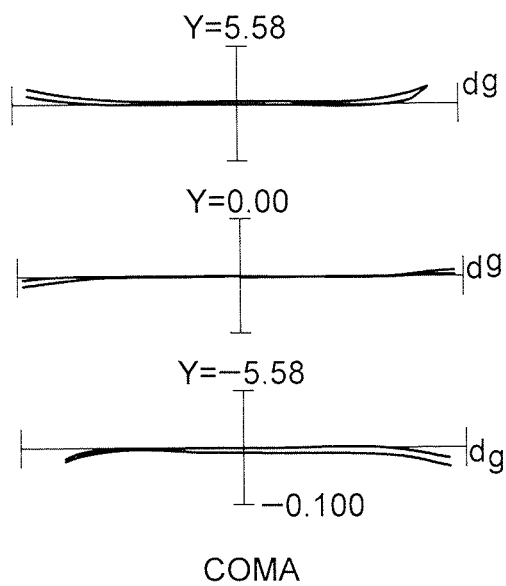
FIGS. 18A and 18B are, respectively, graphs showing meridional transverse aberrations in the wide-angle end state and the telephoto end state of the zooming optical system according to the sixth Example of the present application, upon focusing on infinity and vibration reduction being conducted.
Figure 18B:
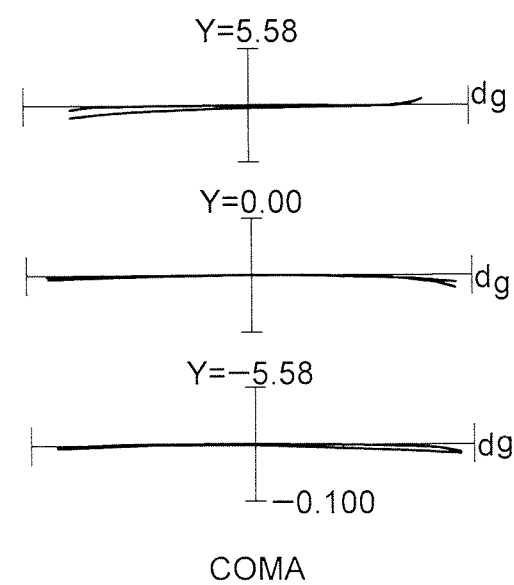

FIGS. 18A and 18B are, respectively, a diagram of a meridional transverse aberration when reducing the vibration against the rotating deviation of 0.60° when focusing on the infinite-distance object in the wide-angle end state, and a diagram of the meridional transverse aberration when reducing the vibration against the rotating deviation of 0.19° when focusing on the infinite-distance object in the telephoto end state of the zooming optical system according to the sixth Example of the present application.

It is understood from the respective aberration diagrams that the zooming optical system according to the sixth Example corrects well the various aberrations from the wide-angle end state to the telephoto end state throughout, exhibits excellent image forming performance and further exhibits excellent image forming performance when reducing the vibrations.

According to the respective Examples, it is feasible to realize the compact and light-weight zooming optical system having the vibration reduction function, an approximately 10-fold high zooming ratio and a wide view angle being 70° or larger in the telephoto end state and exhibiting the superb optical performance. It should be noted that each of the Examples is given byway of a concrete example of the invention of the present application, and the invention of the present application is not limited to these Examples.

The following contents can be properly adopted within the range that does not deteriorate the optical performance of the zooming optical systems according to the first to third embodiments of the present application.

The 4-lens-group configuration and the 5-lens-group configuration have been exemplified by way of the Examples of the numeric values of the zooming optical systems according to the first to third embodiments of the present application, however, the present application not being limited to these configurations, and, for example, the zooming optical systems taking other lens group configurations such as a 6-lens-group configuration can be configured. To be specific, any inconvenience may not be caused by taking a configuration of adding a lens or a lens group on the side closest to the object and on the side closest to the image of the zooming optical system according to each of the first to third embodiments of the present application. It should be noted that the lens group connotes a unit having at least one lens separated from other lens groups through an air distance varying when zooming.

The zooming optical system according to each of the first to third embodiments of the present application may be configured to move a part of the lens group, one entire lens group and the plurality of lens group as the focusing lens group in order to focus on the near-distance object from the infinite-distance object. In particular, it is preferable that at least a part of the second lens group is formed as the focusing lens group. Further, such a focusing lens group can be applied to auto focusing and is also suited to driving by a motor, e.g., an ultrasonic motor for the auto focusing.

Moreover, the zooming optical system according to each of the first to third embodiments of the present application can be also configured so that the whole or a part of any one of the lens groups is moved as the anti-vibration lens group so as to include the component in a direction perpendicular to the optical axis, or is rotationally moved, i.e., swayed in an intra-plane direction containing the optical axis, thereby correcting the image blur caused by the camera shake etc. Particularly in the zooming optical system according to each of the first to third embodiments of the present application, it is preferable that at least apart of the third lens group is formed as the anti-vibration lens group.

Further, the lens surface of each of the lenses configuring the zooming optical system according to each of the first to third embodiments of the present application may be formed as a spherical surface or a flat surface or an aspherical surface. A case that the lens surface is the spherical surface or the flat surface facilitates lens machining and an assembly adjustment and is preferable because of preventing the optical performance from being deteriorated due to an error of the lens machining and the assembly adjustment. Furthermore, the case is preferable since even if the image plane deviates, deterioration in image performance is small. Moreover, if the lens surface is the aspherical surface, it may be sufficient that the lens surface is formed as any one of an aspherical surface based on the cutting work, a glass mold aspherical surface formed by molding a glass in an aspherical shape and a composite aspherical surface formed by coating a resin over the surface of the glass in the aspherical shape. Further, the lens surface may be formed as a diffraction surface, and the lens may be formed as a refractive index distribution type lens (GRIN (GRadient INdex) lens) or a plastic lens.

It is preferable in the zooming optical system according to each of the first to third embodiments of the present application that the aperture stop is disposed between the second lens group and the third lens group or within the third lens group, and an available configuration is that a lens frame substitutes for a role of the aperture stop without providing a member as the aperture stop.

Furthermore, the lens surface of each of the lenses configuring the zooming optical system according to each of the first to third embodiments of the present application may be coated with an anti-reflection film having a high transmittance in a broad wave range. With this configuration, it is feasible to reduce a flare and ghost and to attain the high optical performance with the high contrast.

Moreover, in the zooming optical system according to each of the first to third embodiments of the present application, the zooming ratio ranges from about 3 to about 20.

Next, a camera equipped with the zooming optical system according to each of the first to third embodiments of the present application will be described based on FIG. 19.

Figure 19:
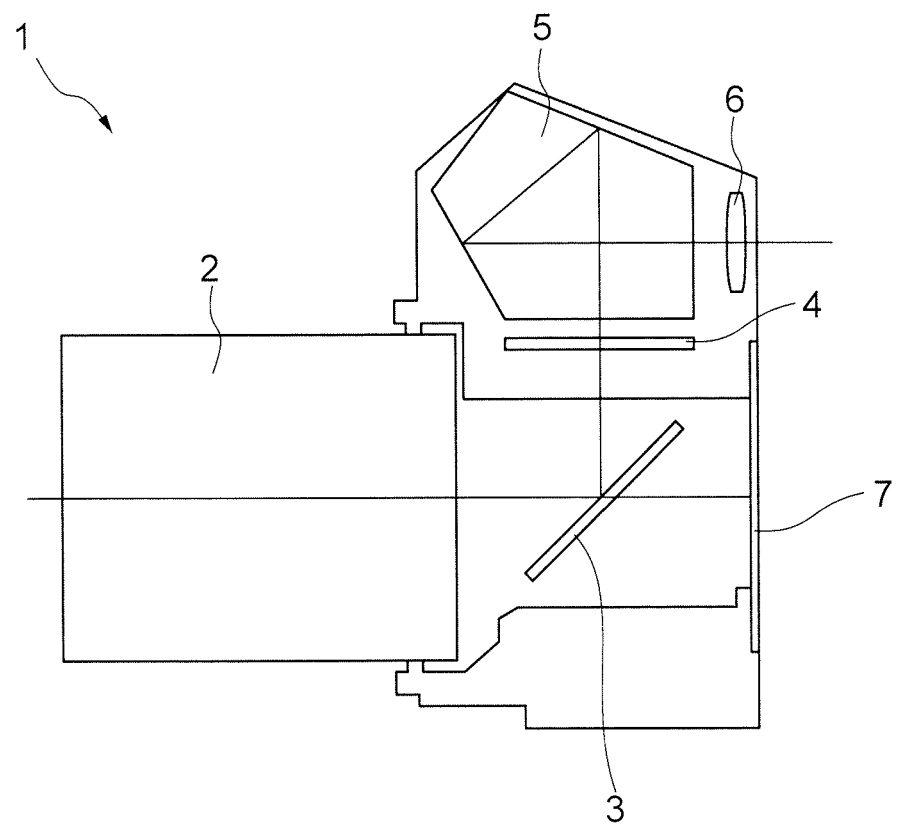
FIG. 19 is a view showing a configuration of a camera equipped with zooming optical system according to the first to third embodiments of the present application.

FIG. 19 is a view showing a configuration of the camera equipped with the zooming optical system according to each of the first to third embodiments of the present application. A camera 1 is a digital single lens reflex camera equipped with the zooming optical system according to the first Example as an imaging lens 2.

In the camera 1, a light flux from an unillustrated object defined as an object to be imaged is collected by the imaging lens 2, and an image is formed on a focusing screen 4 via a quick return mirror 3. The light forming the image on the focusing screen 4, is reflexed a plural number of times within a pentaprism 5 and guided to an eyepiece 6. The operation being thus performed, a photographer can observe the image of the object as an erect image via the eyepiece 6.

Further, when the photographer depresses an unillustrated release button, the quick return mirror 3 retreats off a light path, and the light traveling from the unillustrated object reaches an imaging device 7. The light from the object is thereby imaged by the imaging device 7, and the captured image is recorded as the image of the object on an unillustrated memory. Thus, the photographer can capture the image of the object through the camera 1.

Herein, the zooming optical system mounted as the imaging lens 2 in the camera 1 according to the first Example is, as described above, compact and has the vibration reduction function, the high zooming ratio, the wide-angle view and the superb optical performance. The camera 1 is thereby enabled to realize the superb optical performance while having the vibration reduction function, the high zooming ratio and the wide-angle view and being scaled down. Note that the same effects as those of the camera 1 can be exhibited even by building up a camera mounted with the zooming optical system according to each of the second to sixth Examples as the imaging lens 2. Moreover, the same effects as those of the camera 1 can be exhibited even by mounting the zooming optical system according to each of the Examples on a camera configured not to include the quick return mirror 3.

Finally, an outline of a method for manufacturing the zooming optical system according to each of the first to third embodiments of the present application will be described based on FIGS. 20-22.

Figure 20:
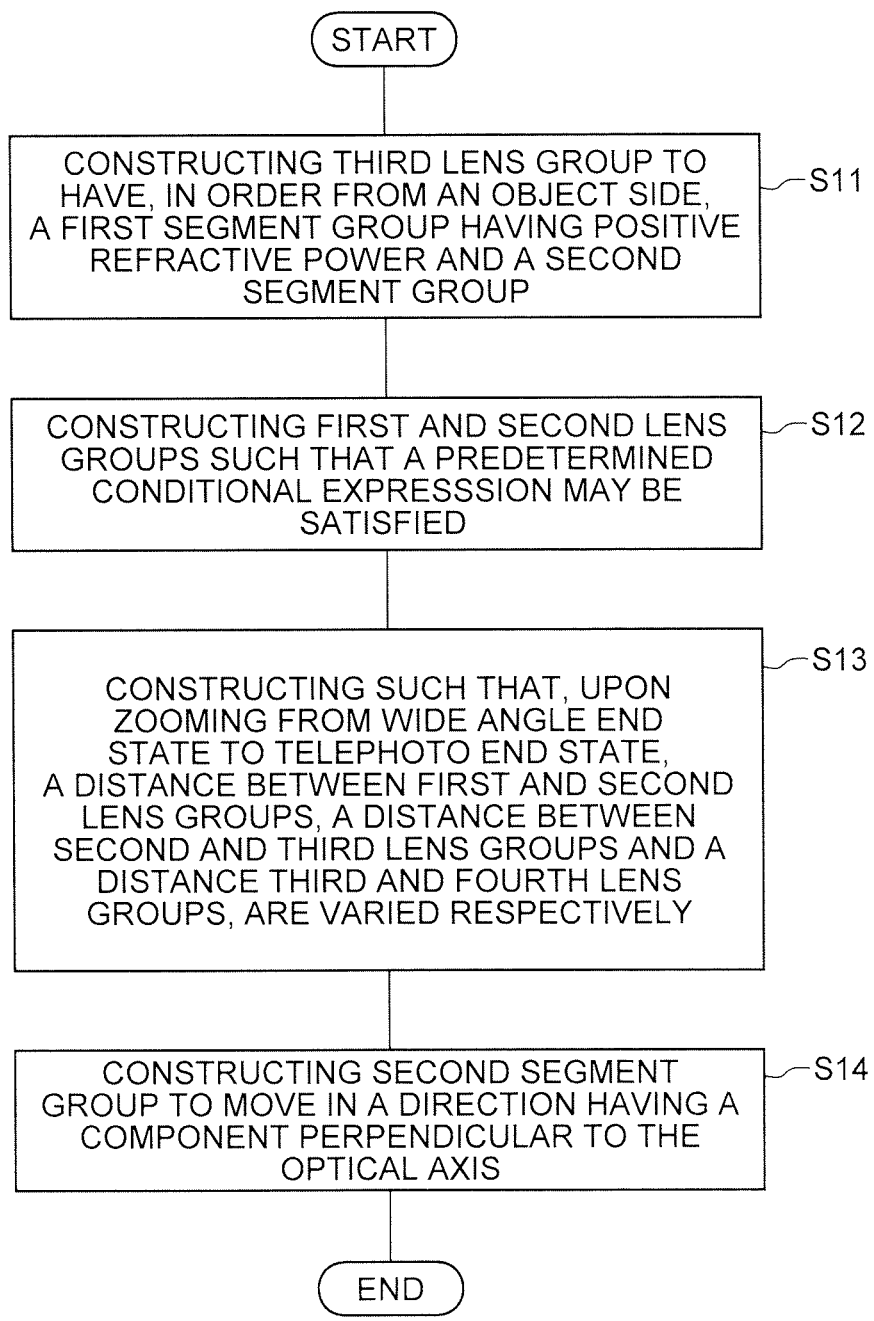
FIG. 20 is a flowchart schematically showing a method for manufacturing the zooming optical system relating the first embodiment of the present application.

The method for manufacturing the zooming optical system as illustrated in FIG. 20 according to the first embodiment of the present application is a method for manufacturing the zooming optical system including, in order from an object side, a first lens group having positive refractive power, a second lens group having negative refractive power, a third lens group having positive refractive power and a fourth lens group having positive refractive power, the method including the following steps S11-S14:

Step S11 of constructing the third lens group to include, in order from the object side, a first segment group having positive refractive power and a second segment group.

Step 12 of constructing the first lens group and the second lens group such that the following conditional expression (1) may be satisfied:

$$8.00<f1/(-f2)<10.00 \qquad (1)$$

where f1 denotes a focal length of the first lens group, and f2 represents a focal length of the second lens group, and disposing the first to fourth lens groups within a lens barrel in order from the object side, Step S13 of constructing such that an air distance between the first lens group and the second lens group, an air distance between the second lens group and the third lens group and an air distance between the third lens group and the fourth lens group may be varied respectively upon zooming to the telephoto end state from the wide-angle end state by providing a known moving mechanism within the lens barrel, and Step 14 of constructing the second segment group to move in a direction having a component perpendicular to the optical axis by providing a known moving mechanism within the lens barrel.

The method for manufacturing the zooming optical system according to the first embodiment of the present application enables a compact zooming optical system to be manufactured, which has the vibration reduction function, the high zooming ratio, the wide-angle view and the superb optical performance.

Figure 21:
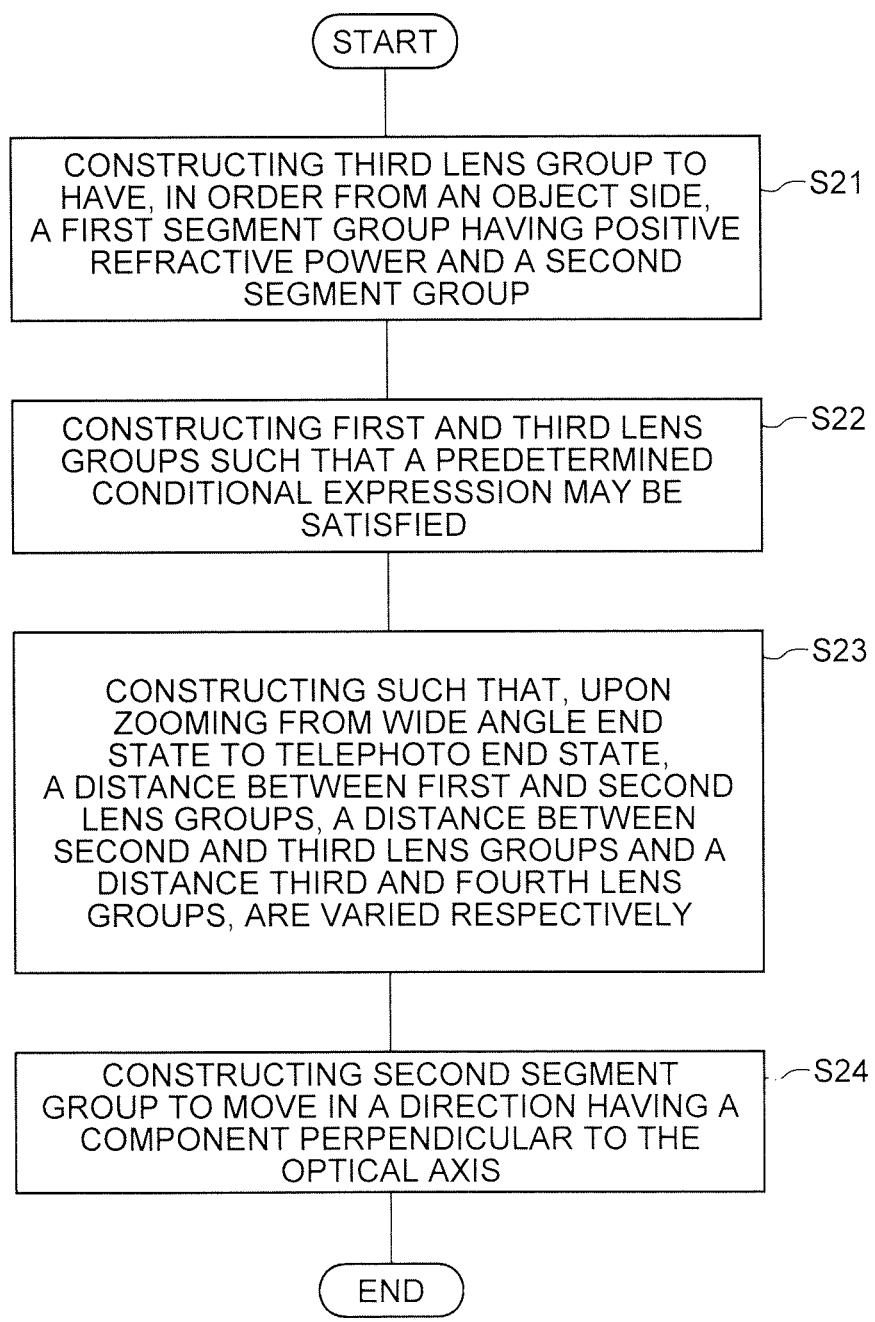
FIG. 21 is a flowchart schematically showing a method for manufacturing the zooming optical system relating the second embodiment of the present application.

The method for manufacturing a zooming optical system as illustrated in FIG. 21 according to the second embodiment of the present application is a method for manufacturing a zooming optical system including, in order from an object side, a first lens group having positive refractive power, a second lens group having negative refractive power, a third lens group having positive refractive power and a fourth lens group having positive refractive power, the method including the following steps S21-S24:

Step S21 of constructing the third lens group to include, in order from the object side, a first segment group having positive refractive power and a second segment group, Step 22 of constructing the first lens group and the third lens group such that the following conditional expression (3) may be satisfied:

$$2.80<f1/f3<4.50 \qquad (3)$$

where f1 denotes a focal length of the first lens group, and f3 represents a focal length of the third lens group, and disposing the first to fourth lens groups within a lens barrel in order from the object side, Step S23 of constructing, by providing a known moving mechanism within the lens barrel, such that an air distance between the first lens group and the second lens group, an air distance between the second lens group and the third lens group and an air distance between the third lens group and the fourth lens group respectively varied, upon zooming to the telephoto end state from the wide-angle end state, and Step 24 of constructing the second segment group to move in a direction having a component perpendicular to the optical axis by providing a known moving mechanism within the lens barrel.

The method for manufacturing the zooming optical system according to the second embodiment of the present application enables a compact zooming optical system to be manufactured, which has the vibration reduction function, the high zooming ratio, the wide-angle view and the superb optical performance.

Figure 22:
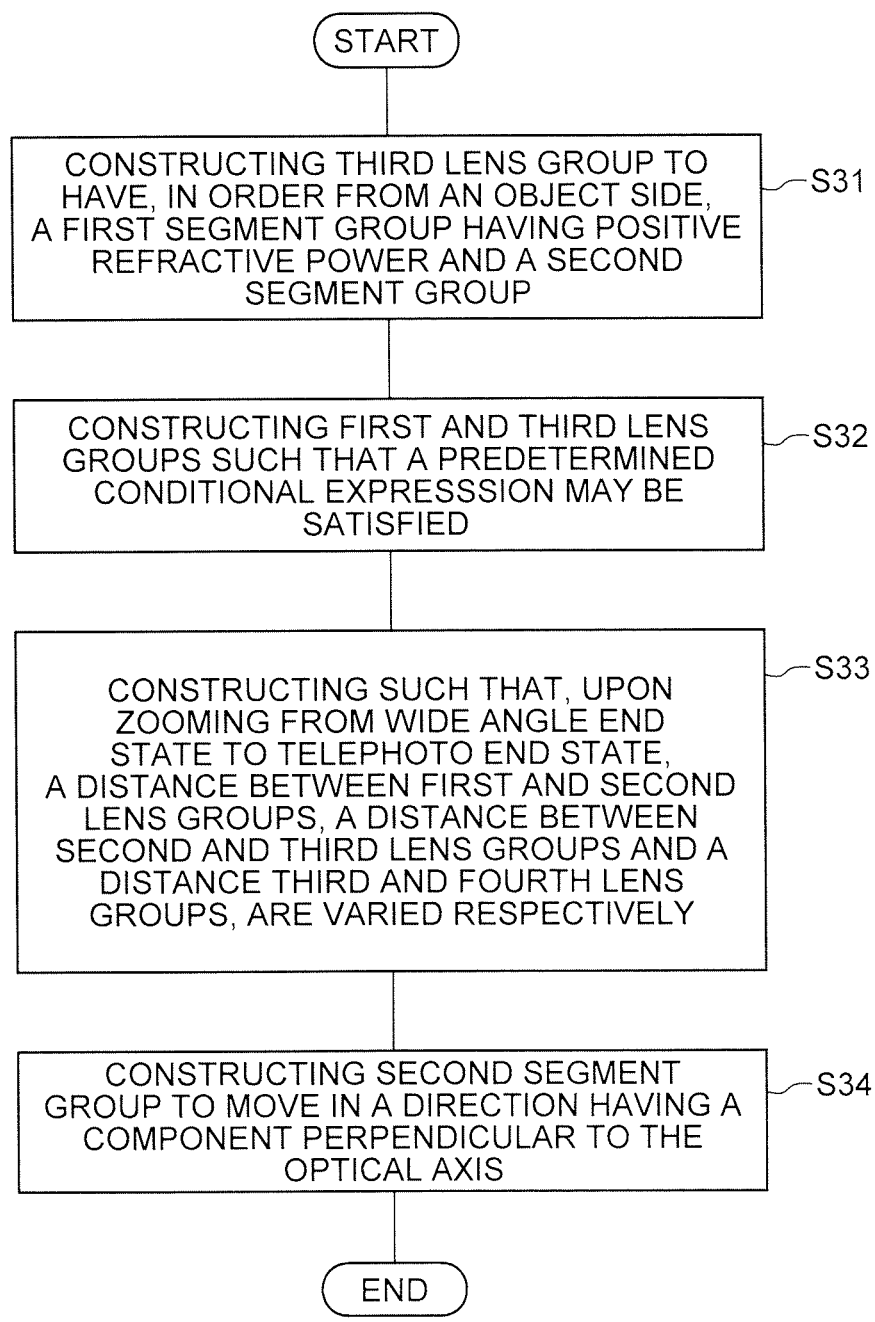
FIG. 22 is a flowchart schematically showing a method for manufacturing the zooming optical system relating the third embodiment of the present application.

The method for manufacturing the zooming optical system as illustrated in FIG. 22 according to the third embodiment of the present application is a method for manufacturing the zooming optical system including, in order from the object side, a first lens group having positive refractive power, a second lens group having negative refractive power, a third lens group having positive refractive power and a fourth lens group having positive refractive power, the method including the following steps S31-S34:

Step S31 of constructing the third lens group to include, in order from an object side, a first segment group having positive refractive power and a second segment group, Step 32 of constructing the first lens group and the third lens group such that the following conditional expressions (5) and (7) may be satisfied:

$$0.20 < |f32|/f1 < 0.43 \quad (5)$$

$$0.60 < f31/f3 < 0.90 \quad (7)$$

where f1 denotes a focal length of the first lens group, f3 represents a focal length of the third lens group, f31 denotes a focal length of the first segment group, and f32 represents a focal length of the second segment group, and disposing the first to fourth lens groups within a lens barrel in order from an object side, Step S33 of constructing such that an air distance between the first lens group and the second lens group, an air distance between the second lens group and the third lens group and an air distance between the third lens group and the fourth lens group respectively varied upon zooming to the telephoto end state from the wide-angle end state by providing a known moving mechanism within the lens barrel, and Step 34 of constructing the second segment group to move in a direction having a component perpendicular to the optical axis by providing a known moving mechanism within the lens barrel.

The method for manufacturing the zooming optical system according to the third embodiment of the present application enables a compact zooming optical system to be manufactured, which has the vibration reduction function, the high zooming ratio, the wide-angle view and the superb optical performance.

What is claimed is:

1. A zooming optical system comprising, in order from an object side: a first lens group having positive refractive power; a second lens group having negative refractive power; a third lens group having positive refractive power; and a fourth lens group having positive refractive power;
   upon zooming from a wide-angle end state to a telephoto end state, a distance between said first lens group and said second lens group, a distance between said second lens group and said third lens group and a distance between said third lens group and said fourth lens group being respectively varied;
   said third lens group having, in order from the object side, a first segment group having positive refractive power and a second segment group;
   said second segment group being movable with a component of movement in a direction perpendicular to the optical axis; and
   the following conditional expressions being satisfied:

$$8.00 < f1/(-f2) < 10.00$$

$$0.60 < f3/f4 < 0.90$$

where f1 denotes focal length of the entire first lens group, f2 denotes focal length of the entire second lens group, f3 denotes focal length of the entire third lens group, f4 denotes focal length of the entire fourth lens group, and at least a part of said second lens group is constructed to move in a direction of the optical axis during focusing.

2. The zooming optical system according to claim 1, wherein said second segment group has negative refractive power.

3. The zooming optical system according to claim 1, wherein the following conditional expression is satisfied:

$$2.80 < f1/f3 < 4.50.$$

4. The zooming optical system according to claim 1, wherein the following conditional expression is satisfied:

$$2.20 < f1/f4 < 3.50.$$

5. The zooming optical system according to claim 1, wherein the following conditional expression is satisfied:

$$0.20 < |f32|/f1 < 0.43$$

where f32 denotes focal length of the entire second segment group.

6. The zooming optical system according to claim 1, wherein the following conditional expression is satisfied:

$$0.60 < f31/f3 < 0.90$$

where f31 denotes focal length of the entire first segment group.

7. The zooming optical system according to claim 1, wherein said second segment group is configured to include a cemented lens of one positive lens and one negative lens.

8. The zooming optical system according to claim 1, wherein the following conditional expression is satisfied:

$$0.35 < (-f2)/f3 < 0.55.$$

9. The zooming optical system according to claim 1, wherein said first lens group is constructed to move in the direction of the optical axis during zooming to the telephoto end state from the wide-angle end state.

10. An optical apparatus comprising said zooming optical system according to claim 1.

11. A method for manufacturing a zooming optical system comprising, in order from an object side: a first lens group having positive refractive power; a second lens group having negative refractive power; a third lens group having positive refractive power; and a fourth lens group having positive refractive power;
    said method comprising steps of
    constructing the third lens group to include, in order from the object side, a first segment group having positive refractive power and a second segment group,
    constructing the first lens group and the second lens group such that the following conditional expressions are satisfied:

$$6.00 < f1/(-f2) < 10.00$$

$$0.60 < f3/f4 < 0.90$$

where f1 denotes focal length of the entire first lens group, f2 represents focal length of the entire second lens group, f3 denotes focal length of the entire third lens group, and f4 denotes focal length of the entire fourth lens group,
    constructing such that a distance between the first lens group and the second lens group, a distance between the second lens group and the third lens group and a distance between the third lens group and the fourth lens group vary respectively upon zooming to a telephoto end state from a wide-angle end state,
    constructing the second segment group to move in a direction having a component perpendicular to the optical axis, and
    constricting at least a part of said second lens group to move in a direction of the optical axis during focusing.

12. The method for manufacturing the zooming optical system according to claim 11, wherein said second segment group has negative refractive power.

13. The method for manufacturing the zooming optical system according to claim 11, wherein the following conditional expression is satisfied:

$$2.80<f1/f3<4.50.$$

14. The method for manufacturing the zooming optical system according to claim 11, wherein the following conditional expression is satisfied:

$$2.20<f1/f4<3.50.$$

15. A zooming optical system comprising, in order from an object side: a first lens group having positive refractive power; a second lens group having negative refractive power; a third lens group having positive refractive power; and a fourth lens group having positive refractive power;
    upon zooming from a wide-angle end state to a telephoto end state, a distance between said first lens group and said second lens group, a distance between said second lens group and said third lens group and a distance between said third lens group and said fourth lens group being respectively varied;
    said third lens group having, in order from the object side, a first segment group having positive refractive power and a second segment group;
    said second segment group being movable with a component of movement in a direction perpendicular to the optical axis; and
    the following conditional expressions being satisfied:

$$0.20<|f32|/f1<0.43$$

$$0.71 \leq f31/f3<0.90$$

where f1 denotes focal length of the entire first lens group, f3 denotes focal length of the entire third lens group, f31 denotes focal length of the entire first segment group, and f32 denotes focal length of the entire second segment group.

16. The zooming optical system according to claim 15, wherein at least a part of said second lens group is constructed to move in a direction of the optical axis during focusing.

17. The zooming optical system according to claim 15, wherein said second segment group has negative refractive power.

18. The zooming optical system according to claim 15, wherein the following conditional expression is satisfied:

$$6.00<f1/(-f2)<10.00$$

where f2 denotes focal length of the entire second lens group.

19. The zooming optical system according to claim 15, wherein the following conditional expression is satisfied:

$$2.20<f1/f4<3.50$$

where f4 denotes focal length of the entire fourth lens group.

20. The zooming optical system according to claim 15, wherein the following conditional expression is satisfied:

$$0.60<f3/f4<0.90$$

where f4 denotes focal length of the entire fourth lens group.

21. An optical apparatus comprising said zooming optical system according to claim 15.

22. A method for manufacturing a zooming optical system comprising, in order from an object side: a first lens group having positive refractive power; a second lens group having negative refractive power; a third lens group having positive refractive power; and a fourth lens group having positive refractive power;
    said method comprising steps of
    constructing the third lens group to include, in order from an object side, a first segment group having positive refractive power and a second segment group,
    constructing the first lens group and the third lens group such that the following conditional expressions are satisfied:

$$0.20<|f32|/f1<0.43$$

$$0.71 \leq f31/f3<0.90$$

where f1 denotes focal length of the entire first lens group, f3 denotes focal length of the entire third lens group, f31 denotes focal length of the first segment group, and f32 denotes focal length of the entire second segment group,
    constructing such that a distance between the first lens group and the second lens group, a distance between the second lens group and the third lens group and a distance between the third lens group and the fourth lens group respectively vary upon zooming to a telephoto end state from a wide-angle end state, and
    constructing the second segment group to move in a direction having a component perpendicular to the optical axis.

23. The method for manufacturing the zooming optical system according to claim 22, wherein the following conditional expression is satisfied:

$$6.00<f1/(-f2)<10.00$$

where f2 denotes focal length of the entire second lens group.

24. A zooming optical system comprising, in order from an object side: a first lens group having positive refractive power; a second lens group having negative refractive power; a third lens group having positive refractive power; and a fourth lens group having positive refractive power;
    upon zooming from a wide-angle end state to a telephoto end state, a distance between said first lens group and said second lens group, a distance between said second lens group and said third lens group and a distance between said third lens group and said fourth lens group being respectively varied;
    said third lens group having, in order from the object side, a first segment group having positive refractive power and a second segment group;
    said second segment group being movable with a component of movement in a direction perpendicular to the optical axis;
    the following conditional expression being satisfied:

$$2.80<f1/f3<4.50$$

where f1 denotes focal length of the entire first lens group, and f3 denotes focal length of the entire third lens group; and
    at least a part of said second lens group is constructed to move in a direction of the optical axis during focusing.

25. The zooming optical system according to claim 24, wherein said second segment group has negative refractive power.

26. The zooming optical system according to claim 24, wherein the following conditional expression is satisfied:

$$2.20<f1/f4<3.50$$

where f4 denotes focal length of the entire fourth lens group.

27. The zooming optical system according to claim 24, wherein the following conditional expression is satisfied:

$$0.35<(-f2)/f3<0.55$$

where f2 denotes focal length of the entire second lens group.

28. The zooming optical system according to claim 24, wherein the following conditional expression is satisfied:

$$0.20<|f32|/f1<0.43$$

where f32 denotes focal length of the entire second segment group.

29. An optical apparatus comprising said zooming optical system according to claim 24.

30. A method for manufacturing a zooming optical system comprising, in order from an object side: a first lens group having positive refractive power; a second lens group having negative refractive power; a third lens group having positive refractive power; and a fourth lens group having positive refractive power;

said method comprising steps of
constructing the third lens group to include, in order from the object side, a first segment group having positive refractive power and a second segment group,
constructing the first lens group and the third lens group such that the following conditional expression is satisfied:

$$2.80<f1/f3<4.50$$

where f1 denotes focal length of the entire first lens group, and f3 denotes focal length of the entire third lens group, constructing such that a distance between the first lens group and the second lens group, a distance between the second lens group and the third lens group and a distance between the third lens group and the fourth lens group respectively vary, upon zooming to the telephoto end state from the wide-angle end state, constructing the second segment group to move in a direction having a component perpendicular to the optical axis, and constructing at least a part of said second lens group to move in a direction of the optical axis during focusing.

31. The method for manufacturing the zooming optical system according to claim 30, wherein the following conditional expression is satisfied:

$$2.20<f1/f4<3.50$$

where f4 denotes focal length of the entire fourth lens group.

32. The method for manufacturing the zooming optical system according to claim 30, wherein the following conditional expression is satisfied:

$$0.35<(-f2)/f3<0.55$$

where f2 denotes focal length of the entire second lens group.

* * * * *